US009846253B2

(12) United States Patent
Bittar et al.

(10) Patent No.: US 9,846,253 B2
(45) Date of Patent: Dec. 19, 2017

(54) SYSTEM AND METHOD OF MAKING ENVIRONMENTAL MEASUREMENTS

(75) Inventors: Michael S. Bittar, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 778 days.

(21) Appl. No.: 13/820,659

(22) PCT Filed: Nov. 12, 2010

(86) PCT No.: PCT/US2010/056551
§ 371 (c)(1),
(2), (4) Date: Mar. 4, 2013

(87) PCT Pub. No.: WO2012/064342
PCT Pub. Date: May 18, 2012

(65) Prior Publication Data
US 2013/0166215 A1    Jun. 27, 2013

(51) Int. Cl.
*G01V 1/40* (2006.01)
*G01V 3/12* (2006.01)
*G01V 3/38* (2006.01)

(52) U.S. Cl.
CPC . *G01V 3/12* (2013.01); *G01V 3/38* (2013.01)

(58) Field of Classification Search
CPC .. G01N 24/081; G01R 27/2611; G01R 33/54; E21B 47/00; G01V 3/38; G01V 3/28; G01V 3/30; G01V 2210/66; G01V 3/12; G01V 3/20; G01V 3/26
See application file for complete search history.

(56) References Cited

U.S. PATENT DOCUMENTS

| | | |
|---|---|---|
| 5,869,968 A | 2/1999 | Brooks et al. |
| 5,892,362 A | 4/1999 | Warren et al. |
| 6,603,313 B1 | 8/2003 | Srnka et al. |
| 6,628,119 B1 | 9/2003 | Eidesmo et al. |
| 6,751,553 B2 | 6/2004 | Young et al. |
| 6,842,006 B2 | 1/2005 | Conti et al. |
| 6,859,038 B2 | 2/2005 | Ellingsrud et al. |
| 6,914,433 B2 | 7/2005 | Wright et al. |
| 7,295,013 B2 | 11/2007 | Conti et al. |
| 7,382,683 B1 * | 6/2008 | Ferber .................. G01V 1/36 367/30 |

(Continued)

FOREIGN PATENT DOCUMENTS

| | | |
|---|---|---|
| WO | WO-2006/088591 A2 | 8/2006 |
| WO | WO-2010/078197 A1 | 7/2010 |
| WO | WO-2010104907 A2 | 9/2010 |
| WO | WO-2012064342 A1 | 5/2012 |

OTHER PUBLICATIONS

"Singapore Application Serial No. 201303394-9, Search Report dated Jul. 7, 2014", 6 pgs.

(Continued)

*Primary Examiner* — Elias Desta
(74) *Attorney, Agent, or Firm* — Gilliam IP PLLC

(57) ABSTRACT

Various embodiments include apparatus and methods to operate with respect to environmental measurements. Apparatus and methods include a processing unit to generate a ratio from signals measured relating to an underground environment and to determine parameters of the underground environment based on the generated ratio.

20 Claims, 14 Drawing Sheets

(56) References Cited

U.S. PATENT DOCUMENTS

| | | | |
|---|---|---|---|
| 2005/0073302 A1 | 4/2005 | Hibbs et al. | |
| 2006/0186887 A1 | 8/2006 | Strack et al. | |
| 2008/0238428 A1 | 10/2008 | Babour et al. | |
| 2008/0265896 A1 | 10/2008 | Strack et al. | |
| 2008/0306693 A1 | 12/2008 | Ferber | |
| 2009/0243616 A1 | 10/2009 | Loehken et al. | |
| 2009/0265111 A1 | 10/2009 | Helwig et al. | |
| 2010/0155138 A1 | 6/2010 | Kuckes | |
| 2010/0155139 A1 | 6/2010 | Kuckes | |
| 2011/0025336 A1 | 2/2011 | Forgang et al. | |
| 2011/0246161 A1 | 10/2011 | Morton et al. | |
| 2012/0069713 A1* | 3/2012 | Geerits | G01V 1/48 367/99 |

OTHER PUBLICATIONS

"International Application Serial No. PCT/US2010/056551, International Search Report dated Oct. 14, 2011", 3 pgs.

"International Application Serial No. PCT/US2010/056551, International Written Opinion dated Oct. 25, 2012", 6 pgs.

"International Application Serial No. PCT/US2010/056551, Written Opinion dated Feb. 4, 2013", 6 pgs.

"International Application Serial No. PCT/US2010/056551, Written Opinion dated Oct. 14, 2011", 7 pgs.

"European Application Serial No. 10781772.8, Office Action dated Jun. 14, 2013", 2 pgs.

"European Application Serial No. 10781772.8, Response filed Dec. 16, 2013 to Office Action dated Jun. 14, 2013", 12 pgs.

"International Application Serial No. PCT/US2010/056551, International Preliminary Report on Patentability dated Apr. 25, 2013", 12 pgs.

"International Application Serial No. PCT/US2010/056551, Response filed Dec. 20, 2012 to Written Opinion dated Oct. 25, 2012", 6 pgs.

"International Application Serial No. PCT/US2010/056551, Response filed Sep. 12, 2012 to Written Opinion dated Oct. 14, 2011", 5 pgs.

"European Application Serial No. 10781772.8, Office Action dated Oct. 20, 2016", 5 pages.

* cited by examiner

SYSTEM AND METHOD OF MAKING ENVIRONMENTAL MEASUREMENTS

RELATED APPLICATIONS

This application is an U.S. National Stage Filing under 35 U.S.C. 371 from International Application No. PCT/US2010/056551, filed on 12 Nov. 2010, and published as WO 2012/064342 A1 on 18 May 2012, which application and publication are incorporated herein by reference in their entirety.

TECHNICAL FIELD

The present invention relates generally to systems for making measurements related to oil and gas exploration.

BACKGROUND

In drilling wells for oil and gas exploration, understanding the structure and properties of the associated geological formation provides information to aid such exploration. However, the environment in which the drilling tools operate is at significant distances below the surface. Controlled source electromagnetics (CSEM) is a technique that can be applied to evaluate resistivity variations deep underground, where the CSEM technique uses sensors that are separated by very large distances. For example, CSEM may be used to predict reservoir fluid properties and to detect resistivity of hydrocarbon deposits in marine environments. This technology may be applied to evaluate regions from near the surface to large depths below the sea floor.

In marine applications, such a sensing system typically is deployed as independent vessels or tow units, where each vessel and unit has a sensor capable of transmitting or receiving a signal. Moreover, for complete evaluation of the reservoirs that span a large area, multiple sensors and evaluation points are used. Due to the sensors being separated by large distances and disposed on different bodies, effects due to winds, tides, or waves may affect the relative orientation, signal strength, and signal timing associated with each sensor on the different vessels or tow units. Furthermore, synchronization of such sensors may be based on a time-consuming calibration scheme or a GPS (global positioning system) clock, which may not be operational under bad weather conditions. Further, the usefulness of such measurements may be related to the precision or quality of the information derived from such measurements.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 1:
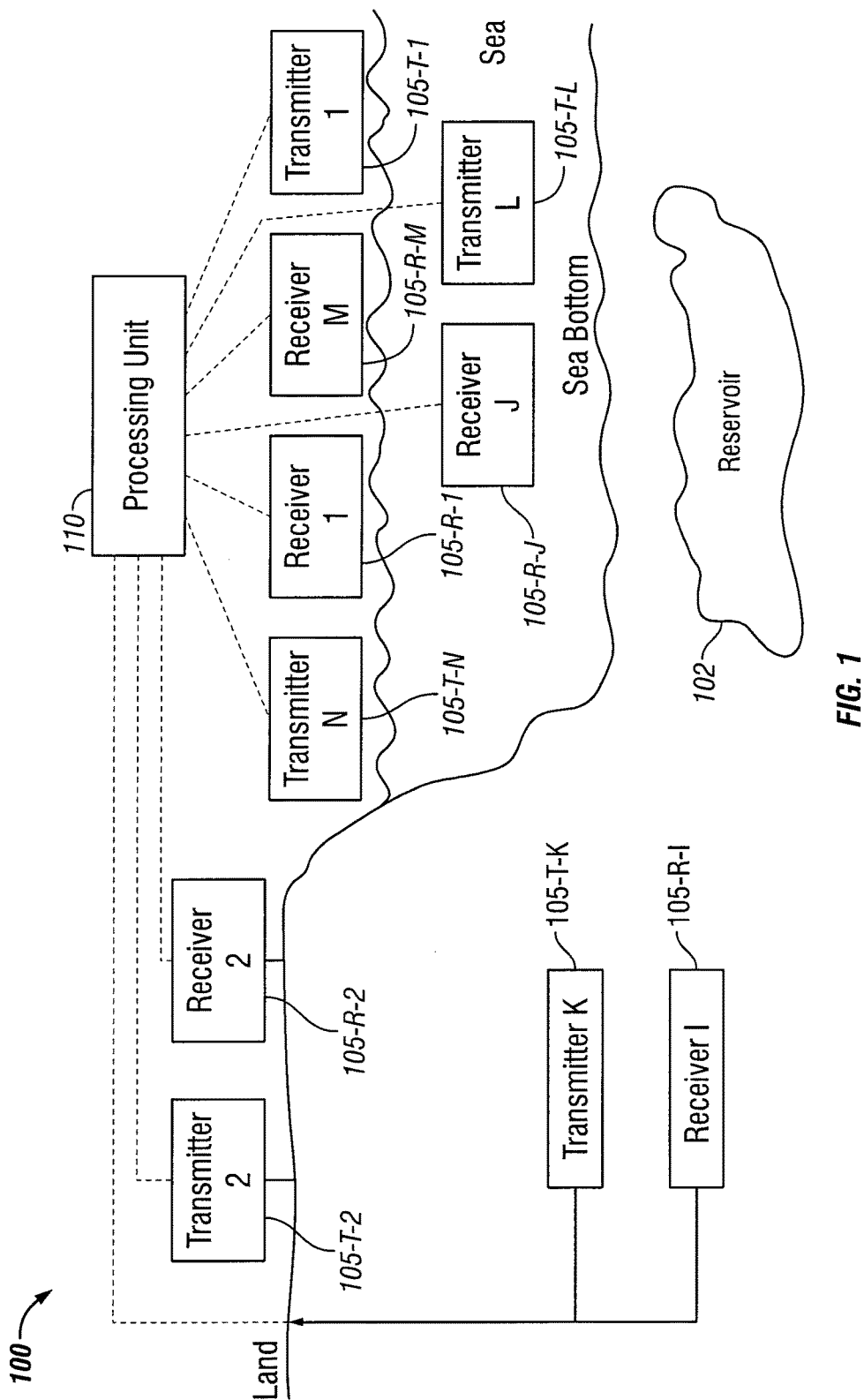
FIG. 1 shows a block diagram of an example system operable to make environmental measurements, according to various embodiments.

FIG. 1 shows a block diagram of an example embodiment of a system 100 operable to make environmental measurements. System 100 includes a plurality of transmitters 105-T-1, 105-T-2 . . . 105-T-K . . . 105-T-L . . . 105-T-N and a plurality of receivers 105-R-1, 105-R-2 . . . 105-R-I . . . 105-R-J . . . 105-T-M. Depending on the application, the number of transmitters may differ from the number of receivers. System 100 includes a processing unit 100 to process signals collected from the receivers. From the received signals, information on the environment in which the transmitters and receivers operate can be extracted.

Processing the received signals can include generating a ratio of the measured signals to compensate for effects of environmental conditions and other perturbations on components of the tools of system 100. The generated ratio or ratios provide compensated signals on which processing unit 110 can perform an inversion operation to determine parameters of the environment in which system 100 operates. These parameters can be parameters of an underground environment including properties of the underground environment below the bottom of a body of water. For example, system 100 can use be used to take measurements, perform a compensation operation on the measured signals, and apply an inversion operation on the compensated signals to determine properties of a reservoir 102 located below sea bottom. Such properties of reservoir 102 may include reservoir depth, reservoir thickness, reservoir resistivity, reservoir shape, or combinations thereof.

Processing unit 110 can also be configured to control activation of the transmitters 105-T-1, 105-T-2 . . . 105-T-K . . . 105-T-L . . . 105-T-N and selection from receivers 105-R-1, 105-R-2 . . . 105-R-I . . . 105-R-J . . . 105-T-M of signals that are presented to the compensation operation. Selection of receivers 105-R-1, 105-R-2 . . . 105-R-I . . . 105-R-J . . . 105-T-M can be realized by collecting signals from all the receivers and choosing, from the set of collected signals, those signals appropriate to form the desired ratio or ratios of signals. Alternatively, specific selection of receivers from receivers 105-R-1, 105-R-2 . . . 105-R-I . . . 105-R-J . . . 105-T-M can be realized by controlling circuits that operate the communication paths from each of the receivers.

Transmitters 105-T-1, 105-T-2 . . . 105-T-K . . . 105-T-L . . . 105-T-N and receivers 105-R-1, 105-R-2 . . . 105-R-I . . . 105-R-J . . . 105-T-M can be used in various arrangements. In marine applications, all of transmitters 105-T-1, 105-T-2 . . . 105-T-K . . . 105-T-L . . . 105-T-N and receivers 105-R-1, 105-R-2 . . . 105-R-I . . . 105-R-J . . . 105-T-M can be disposed at or above the surface of a body of water. All of transmitters 105-T-1, 105-T-2 . . . 105-T-K . . . 105-T-L . . . 105-T-N and receivers 105-R-1, 105-R-2 . . . 105-R-I . . . 105-R-J . . . 105-T-M can be disposed in the body of water. All of transmitters 105-T-1, 105-T-2 . . . 105-T-K . . . 105-T-L . . . 105-T-N and receivers 105-R-1, 105-R-2 . . . 105-R-I . . . 105-R-J . . . 105-T-M can be disposed on or below a land surface and/or a floor of the body of water. Alternatively, transmitters 105-T-1, 105-T-2 . . . 105-T-K . . . 105-T-L . . . 105-T-N and receivers 105-R-1, 105-R-2 . . . 105-R-I . . . 105-R-J . . . 105-T-M can be distributed among the body of water, land near the body of water, under land near the body of water, and/or under the bottom of the body of water. Various combinations of sensors can be realized to generate compensated signals to account for perturbations on system 100.

In addition, transmitters 105-T-1, 105-T-2 . . . 105-T-K . . . 105-T-L . . . 105-T-N and receivers 105-R-1, 105-R-2 . . . 105-R-I . . . 105-R-J . . . 105-T-M can be realized in various forms of magnetic dipole sensors and/or electric dipole sensors. The magnetic dipole sensors or electric dipole sensors can be selected from a group including tilted coil antennas, non-tilted coil antennas, solenoid antennas, toroidal antennas, electrode-type antennas, transceivers, or combinations thereof. The selection of the type of transmitter sensor or receiver sensor may depend on the application.

Selected transmitters, each realized as a dipole antenna source, can be activated to transmit a low-frequency electromagnetic field. The generated dipole field can interact with an underground region and a resulting field can be acquired at the receivers. The characteristics of the acquired resulting field signals can be used to determine information regarding the underground region such as the region's presence, thickness, and lateral extent. The acquired resulting field signals can be provided to processing unit 110 for analysis. These signals may be provided in various manners. The transmitters and receivers can be tracked and located acoustically such that, when acquisition of data is complete, the receivers may be recovered, depending on their measurement location, and the data can be downloaded to processing unit 110 followed by analysis at processing unit 110. Alternatively, the acquired data may be communicated to processing unit 110 over communication vehicles as is appropriate for the environment in which each respective sensor is located. The data acquired in this manner may be analyzed relative to characteristics of the region of interest, such as its electrical resistivity (or in terms of its electrical conductivity). The resistivity (conductivity) data can be used to determine resistivity contrast between oil- or gas-saturated rocks and those with a significant water content and/or to determine resistivity contrast between a reservoir and surrounding formation.

The sensitivity of the measurement and analysis employed in system 100 may depend on the arrangement of the transmitters and receivers during the collection of measurement signals. Selected transmitters and receivers may be operated with the transmitters and receivers disposed with respect to each other as a substantially rectangular arrangement. The rectangular arrangement of transmitters and receivers may be a substantially square arrangement. In addition, transmitters can be selected and a plurality of sets of receivers can be selected to pair with the selected transmitters such that activation of the selected transmitters and collection of measured signals from receivers in each respective set provides measured signals for array processing of ratios for performing inversion operations.

Figure 2:
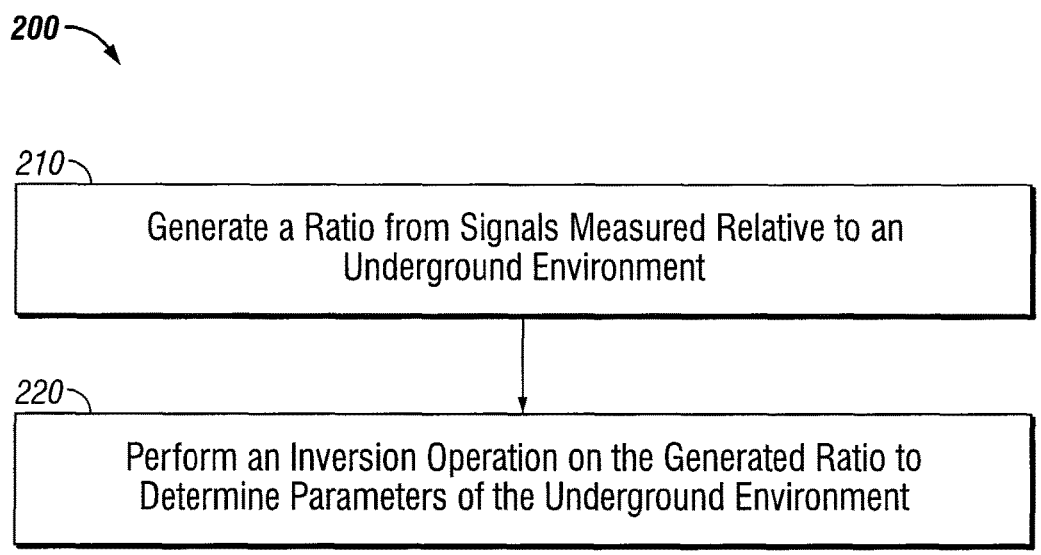
FIG. 2 shows features of an example method to compensate for effects of environmental and other perturbations on a measuring system, according to various embodiments.

FIG. 2 shows features of an example embodiment of a method 200 to compensate for effects of environment and other perturbations on a measuring system. Method 200 can be used with respect to systems similar to or identical to system 100 of FIG. 1. At 210, a ratio is generated from signals measured relative to an underground environment. These signals may be acquired by activating a plurality of transmitters and collecting signals received at a plurality of receivers in response to activating the plurality of transmitters. Operating the transmitters and receivers can be conducted with the transmitters and receivers disposed with respect to each other as a substantially rectangular arrangement. The transmitters and receivers can be disposed with respect to each other as a substantially square arrangement. In addition, the transmitters and receivers may be disposed at or above the surface of a body of water, in the body of water, on or below a land surface and/or a floor of the body of water, or may be distributed among the body of water, land near the body of water, under land near the body of water, and/or under the bottom of the body of water. Sensors in different types of locations may be used to provide signals on which compensation operations can be performed to account for perturbations in the measuring system For receivers j and k of the plurality of receivers and for transmitters i and k of the plurality of transmitters, the generated ratio can include $$\frac{V_{ij}V_{kl}}{V_{il}V_{kj}},$$

where $V_{ij}$ is the signal obtained at receiver j when transmitter i is transmitting, $V_{kj}$ is the signal obtained at receiver j when transmitter k is transmitting, $V_{il}$ is the signal obtained at receiver l when transmitter i is transmitting, $V_{kl}$ is the signal obtained at receiver l when transmitter k is transmitting. Method 200 may include selecting transmitters and selecting a plurality of sets of receivers to pair with the selected transmitters such that activation of the selected transmitters and collection of measured signals from receivers in each respective set provides measured signals for array processing of ratios for performing inversion operations.

At 220, an inversion operation is performed on the generated ratio to determine parameters of the underground environment. Performing an inversion operation or inversion operations can include using a forward model or a library. A forward model provides a set of mathematical relationships for sensor response that can be applied to determining what a selected sensor would measure in a particular environment, which may include a particular formation. A library can include information regarding various formation properties that can be correlated to measured responses to selected probe signals. Performing an inversion operation or inversion operations can include performing an iterative process or performing a pattern matching process. The inversion operation or operations can be applied with respect to a reservoir such that a reservoir depth, a reservoir thickness, a reservoir resistivity, a reservoir shape, or a combination thereof can be determined.

In various embodiments, a system and a method for making measurements are configured to operate on acquired signals such that the operation completely or partially compensates for effects such as wind, tide, wave, or other perturbations with respect to the relative orientation, signal strength, and signal timing associated with sensors of the system. A system, or device, using this process reduces or eliminates spurious effects on amplitude, phase (or timing) of the received signal. A system, or device, using this process also reduces associated environmental effects: winds, tides, or waves that may affect the relative orientation associated with each sensor on the different vessels or tow units. The system uses a number of transmitters and receivers, where transmitters and receivers are typically electric dipoles for deeper sensing. Other types of sensors can be used. In an embodiment, a system comprises two transmitters and two receivers. By using a certain ratio of at least four measurements, compensation of a variety of measurement errors can be achieved. Such a measurement system of generating, collecting, and processing data allows for more accurate, deeper, and more reliable measurements than conventional methods. As compared to conventional methods, various embodiments of a measurement system and its operation can provide reliable measurements that are largely independent of weather conditions, can provide reliable measurements largely independent of sensor strength and timing, can operate without the use of expensive device components to compensate for weather, sensor or synchronization effects, can operate without collinear or coplanar sensor placement, can be extended in operation to large sensor arrays, and can provide deep and accurate sensing of underground reservoirs.

Figure 3:
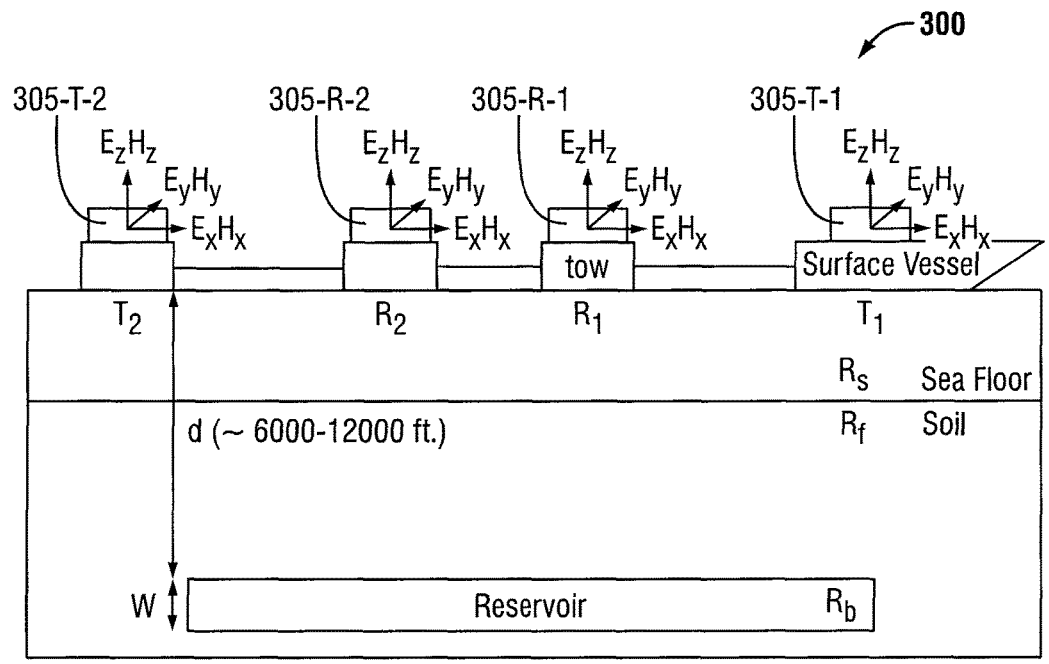
FIG. 3 shows an example arrangement of sensors of a measuring system, according to various embodiments.

FIG. 3 shows an example embodiment of an arrangement of sensors of a measuring system 300. System 300 includes four sensors, where two of the sensors are transmitters (T1 and T2) 305-T-1 and 305-T-2, and the other two are receivers (R1 and R2) 305-R-1 and 305-R-2. These sensors can be either magnetic or electric dipoles, which can typically be realized by coil, solenoid, toroidal, or electrode type antennas. Alternatively, these sensors can be realized as transceivers, where each such sensor can operate both as a transmitter and a receiver. Sensor orientations and positions can be chosen arbitrarily in three dimensions. The sensors do not need to be collinear or coplanar as shown in FIG. 3.

However, compensation of specific effects can be enhanced or optimal for specific sensor configurations. As a result, the operating configuration can be chosen by considering the major effects specific to the application and the sensor electronics. In situations that include a conductive formation and a relatively resistive reservoir, an electric dipole sensor may provide enhanced sensing depth, while a magnetic dipole sensor may provide for enhanced operation in situations that include a resistive formation and a relatively conductive reservoir. In addition, an electric dipole sensor can be formed by using a plurality of electrodes separated by some distance. Typical operating frequency of system 300 can be chosen based on the formation and reservoir resistivity. The operating frequency may include, but is not limited to, a frequency in the range from about 0.01 Hertz to about 100 Hertz. Any of sensors 305-T-1, 305-T-2, 305-R-1, and 305-R-2 may be a standalone sensor located in a vessel, where more than one sensor may be located in a single vessel. The vessels may be powered and mobile, or towed by another vessel. Each of the four sensors 305-T-1, 305-T-2, 305-R-1, and 305-R-2 may be placed in a different geography to optimize sensing accuracy and depth. A method similar to or identical to the method discussed with respect to FIG. 2 may be used with system 300.

Figure 4:
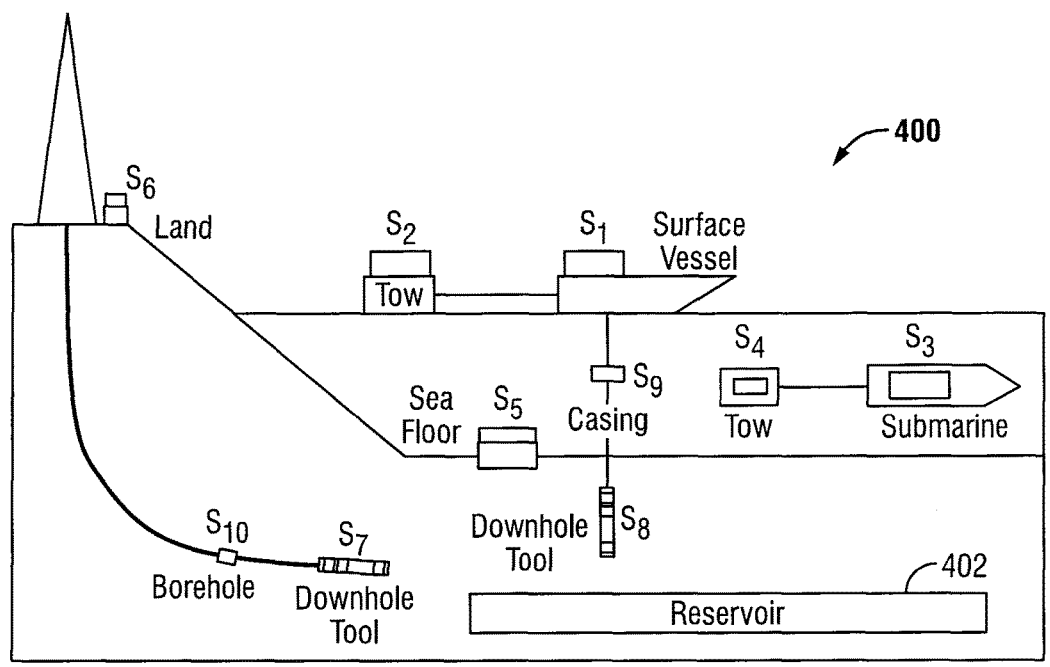
FIG. 4 shows example variations of sensor placement of a measuring system, according to various embodiments.

FIG. 4 shows an example embodiment of variations of sensor placement of a measuring system 400, illustrating different sensor placement options. Each of the sensors can be located in surface vessels, towed by surface vessels, located on permanently or temporarily fixed platforms on the sea surface, located on casing of wells, permanently attached or temporarily positioned at the sea floor, located in or towed by submarines, located on downhole tools, on land, or other location in which the sensor can be positioned relative to an underground region to be investigated, such as reservoir 402. The sensors selected for operation in system 400 can be any of sensors $S_1 \ldots S_{10}$ on similar holding structures or distributed among different locations as shown in FIG. 4. A method similar to or identical to the method discussed with respect to FIG. 2 may be used with system 400.

In various embodiments, in systems applying compensation operations, sensors may operate at multiple frequencies. At each of the multiple operating frequencies, transmitters can be activated either one by one or simultaneously. In response to these activations, received signals at the receivers can be recorded. The signal obtained at the receiver j when transmitter i is transmitting is denoted herein as $V_{ij}$. Each of the signals $V_{ij}$ are sensitive to effects of wind, tide, wave, or sensor strength or timing. As a result, the measured signal $V_{ij}$ can be written as $$V_{ij} = (C_i C_j + C_{ij}) V_{ij}' \tag{1}$$

Where $V_{ij}'$ is the ideal response in the absence of any effects and $C_i$, $C_j$ and $C_{ij}$ are effect parameters. $C_i$ is an effect on the ith antenna, and $C_{ij}$ is an effect on the channel formed by the ith and jth antennas. All types of multiplicative effects in a measurement can be decomposed into such components, where the effects are characterized as being either associated with an individual sensor or with the channels formed in between sensor pairs. A ratio can be generated to form a compensated signal as $$\text{Compensated Signal} = \frac{V_{ij} V_{kl}}{V_{il} V_{kj}} \tag{2}$$

In equation (2), i and k refer to transmitters and j and l refer to receivers. The compensated signal can be written in terms of the ideal measurements, in the absence of any effects, as $$\text{Compensated Signal} = \frac{(C_i C_j + C_{ij})(C_k C_l + C_{kl}) V_{ij}' V_{kl}'}{(C_i C_l + C_{il})(C_k C_j + C_{kj}) V_{il}' V_{kj}'} \tag{3}$$

In situations where effects associated with channels are much smaller than those associated with individual sensors ($C_{xy} \ll C_x$ and $C_{xy} \ll C_y$ for all x and y), the compensated signal can be approximated as $$\text{Compensated Signal} \approx \frac{C_i C_j C_k C_l V'_{ij} V'_{kl}}{C_i C_l C_k C_j V'_{il} V'_{kj}} \quad (4)$$

$$\approx \frac{V'_{ij} V'_{kl}}{V'_{il} V'_{kj}}$$

It can be seen from equation (4) that the compensated signal is effectively independent of effects on individual sensors. As a result, a compensated signal can be used for eliminating effects that can be expressed as $C_i$ or $C_j$ in equation (1). The kind of effects that can be eliminated includes, but is not limited to, unknown or varying transmitter signal magnitude, unknown or varying receiver amplification, unknown transmitter and receiver phase, certain variations in sensor orientations, certain variations in sensor positions, differences in sensor electronics, and differences in sensor type.

The compensation operation can also be extended to time-domain systems. In such processing, the time domain signal can be converted into a frequency domain signal by a transformation function. Generation of the compensation ratios can be performed on the measurement signals at each frequency for all the frequencies used.

Figure 5:
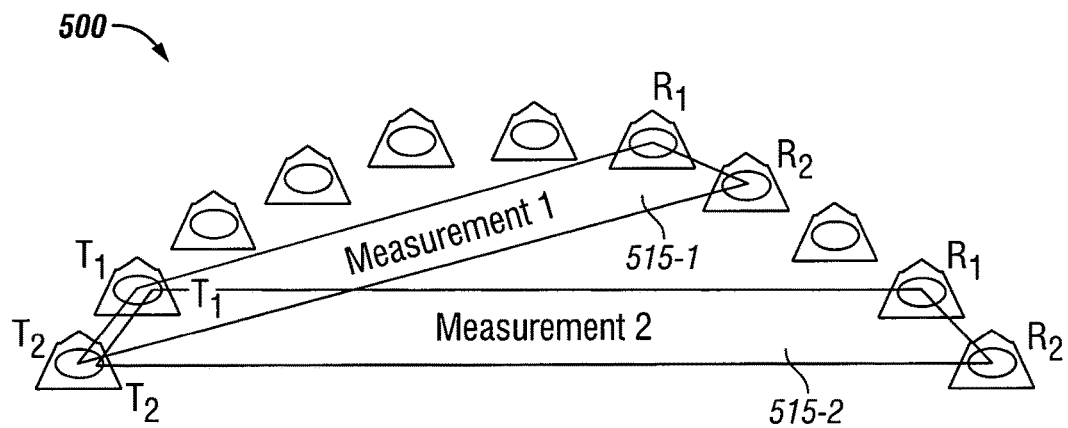
FIG. 5 shows an example of an array processing arrangement, according to various embodiments.

FIG. 5 shows an example embodiment of an array processing arrangement 500. Equations (1)-(4), which are described with respect to four sensors, can be generalized to arrays of multiple sensors. Array processing arrangement 500 can be operated as a plurality of sets of transmitters and receivers, for example, sets 515-1 and 515-2. Sets 515-1 and 515-2 can be operated as selected combinations of four antenna elements. A compensated signal can be calculated for each set 515-1 and 515-2. Array processing arrangement 500 is not limited to two sets or four sensors per set. The order of measurement of individual signals, $V_{ij}$, can be independent of the order of compensated signal calculation. The signals obtained from all selected combinations can be used as an input to an inversion algorithm that compares the compensated signal to signals in a library or signals obtained from a forward model. The selection of measurements that are included in a compensated signal can be chosen to optimize the inversion process. The selection of measurements that are included in a compensated signal can be chosen to estimate desired parameters associated with a specified region. For example, selection of measurements that are included in a compensated signal can be chosen to estimate or optimally estimate parameters associated with a reservoir such as reservoir depth, thickness, shape, and/or resistivity. In most cases, the combination of sensor elements with the largest spatial diversity in sensor placement can provide the optimum process. A method similar to or identical to the method discussed with respect to FIG. 2 may be used with array processing arrangement 500.

Figure 6:
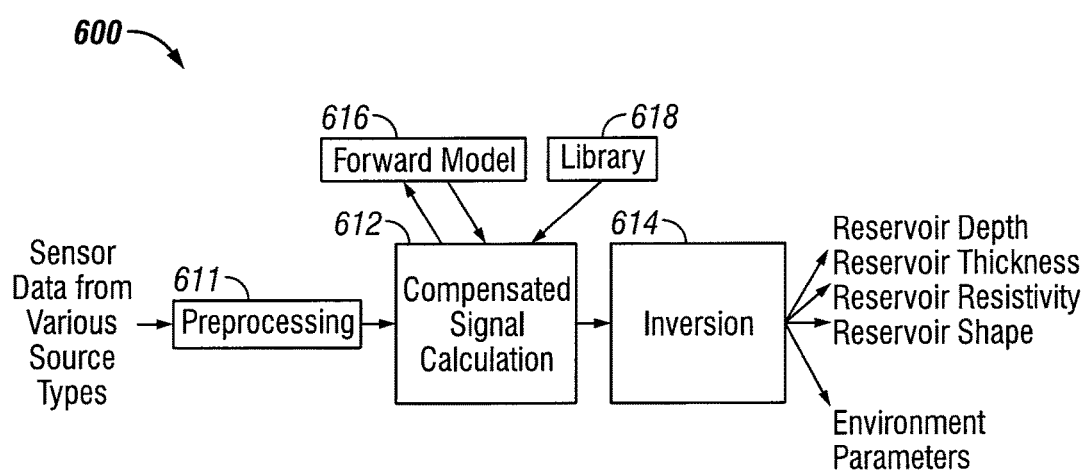
FIG. 6 shows features of an example method to determine environmental parameters based on compensating for effects of environment and other perturbations on measured signals, according to various embodiments.

FIG. 6 shows features of an embodiment of a method 600 to determine environmental parameters based on compensating for effects of environmental and other perturbations on measured signals. Method 600 can be applied to or used in systems as described herein with respect to FIGS. 1-5 and 7-13. Inversion 614 can be performed by comparing the compensated signals from compensated calculation 612 with values in a library 618 or with values obtained by a forward model 616 iteratively. In an example iterative use of a forward model, an initial value or guess of a property, such as a conductivity, of a formation and a forward model is applied to the initial value. The forward model provides a response. The forward model response is compared with a measured value and a next guess in generated based on the comparison. The comparison process continues to adjust the guess until the forward model values and the measured results agree.

Library 618 can be used with a pattern matching inversion process. Library 618 includes correspondences between a physical measurement and a property or an identification of the nature of a physical entity that generated a particular electromagnetic or acoustic field in response to a probe signal. For example, measurement of a specific voltage can be mapped to a specific type of reservoir. By comparing the measured value with a library including such values, a parameter of the reservoir can be obtained from the library by the matching process. A pattern of measured voltages can be matched to voltages in the library to identify the desired parameter.

Although the compensated measurement provides the basis for the main inversion operation, non-compensated measurements can be used to obtain additional information regarding an underground reservoir or environmental parameters. Such processing of non-compensated measurements can be conducted at preprocessing 611 of measured signals before compensated signal calculation 612. Preprocessing 611 may be optional in various applications.

Outputs from inversion 614 can include parameters associated with a reservoir, such as depth, thickness, resistivity, and/or shape. The contrast between properties of the identified reservoir and its surrounding formations can be used to provide images of the region that includes the underground reservoir. Outputs from inversion 614 can also include other parameters associated with the environment, in which the measurements are taken, including the sensing system itself. These other parameters can be used to enhance or optimize sensing performance. Different types of sensors can be combined for optimum spatial diversity. For example, as shown in FIG. 4, sensors that are deployed at the sea floor can be used in combination with sensors in a submarine, sensors in land can be used in combination with a downhole tool from a rig, or other combinations can be used.

Use of compensated signals in inversion 616 can reduce or eliminate effects associated with weather or unknown sensor parameters. Since forward models and libraries typically do not include these effects, any reduction of these perturbing effects provided by the compensation operation translates to improved inversion performance. Without such reduction, an inversion system may need to parameterize and solve for these effects as well, which can reduce the inversion performance and stability.

In various embodiments, a compensation scheme can be utilized to eliminate weather effects and reduce burden in electronics that exist in large distance controlled source measurements. The compensation scheme uses a certain ratio of measured signals that are obtained from sensors, where the sensors are not necessarily collinear or coplanar. This type of measurement can eliminate amplitude and phase effects that are specific or partially associated to individual antenna elements. These effects include changes in the orientation or relative position of marine or submarine vessels due to winds, tides, or waves. Furthermore, difficulty of GPS synchronization, unknown transmitter strength, or receiver gain may be overcome by the compensation scheme. Overcoming perturbing effects may be important in controlled source measurements, which uses a large number of sensors, since each sensor may have a different strength or gain due to differences in placement. As a result, compensation methods and systems, as disclosed herein, may reduce the burden and associated expenses on electronics. In addition, such compensation systems and processes can improve depth and accuracy in detecting underground reservoirs.

FIGS. 7A-7D show results of a model comparing a conventional approach to determine reservoir properties with an example embodiment of compensated signal technique. The inversion operation used includes an iterative inversion algorithm based on a forward model. The results are for a controlled source measurement using two electric dipole transmitting sensors, T1 and T2, and two electric dipole receiving sensors, R1 and R2. These sensors are placed in a rectangular arrangement, where each side of the rectangle has a length L=3.6576 km. The controlled source measurement is operated at two frequencies f=0.05 Hz and f=0.2 Hz in this example. Parameters for this example include water resistivity $R_{water}$=0.25Ω, soil resistivity $R_{soil}$=1Ω, width of sea column $w_{sea}$=250 feet, reservoir depth $z_{reservoir}$=6000 feet, reservoir width $w_{reservoir}$=100 feet, reservoir resistivity=50Ω and reservoir size $L_{reservoir}$=12 km. Receivers are located in small vessels, which reflect changes in elevation angles due to wave effects on the sea. A normal distribution in elevation angle with a 30° standard deviation is considered. Transmitters are located in larger vessels, which are not affected by the waves.

Figure 7A:
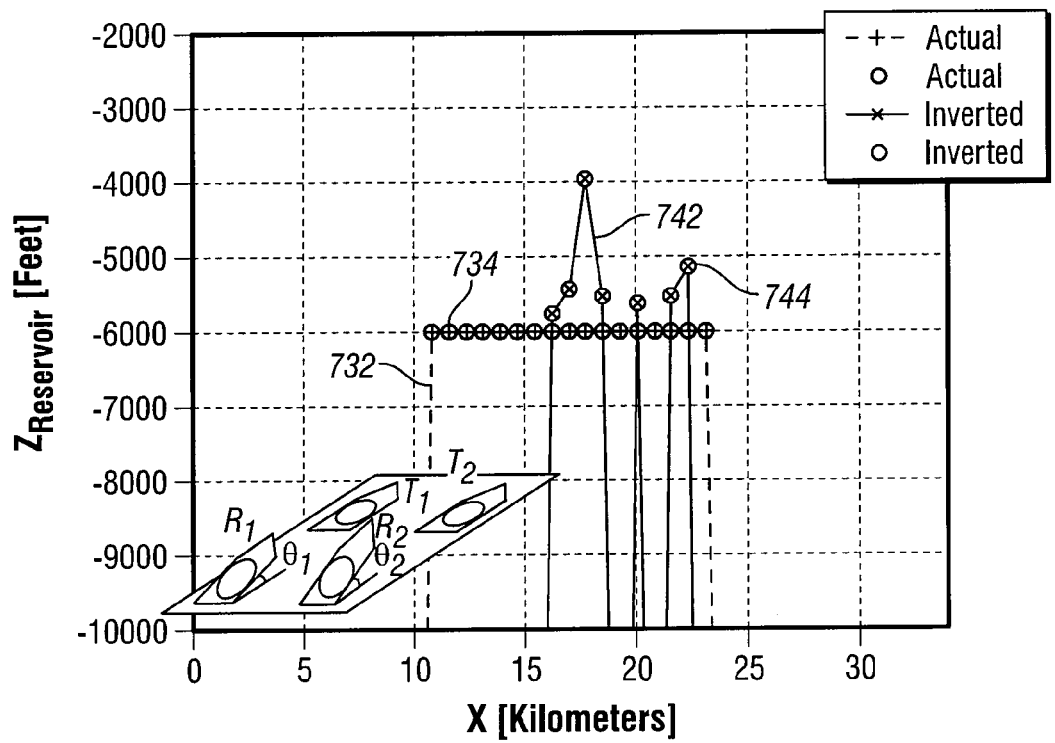
FIGS. 7A-7D show results of a model comparing a conventional approach to determine reservoir properties with an example of compensated signal technique in accordance with various embodiments.
Figure 7B:
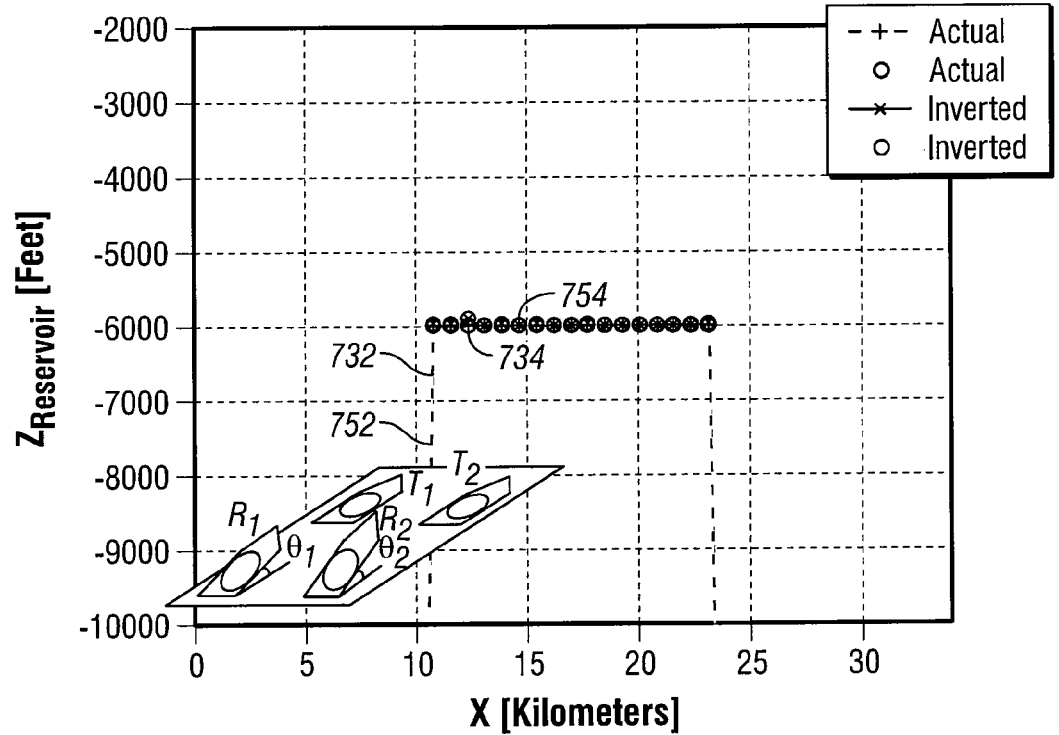
Figure 7C:
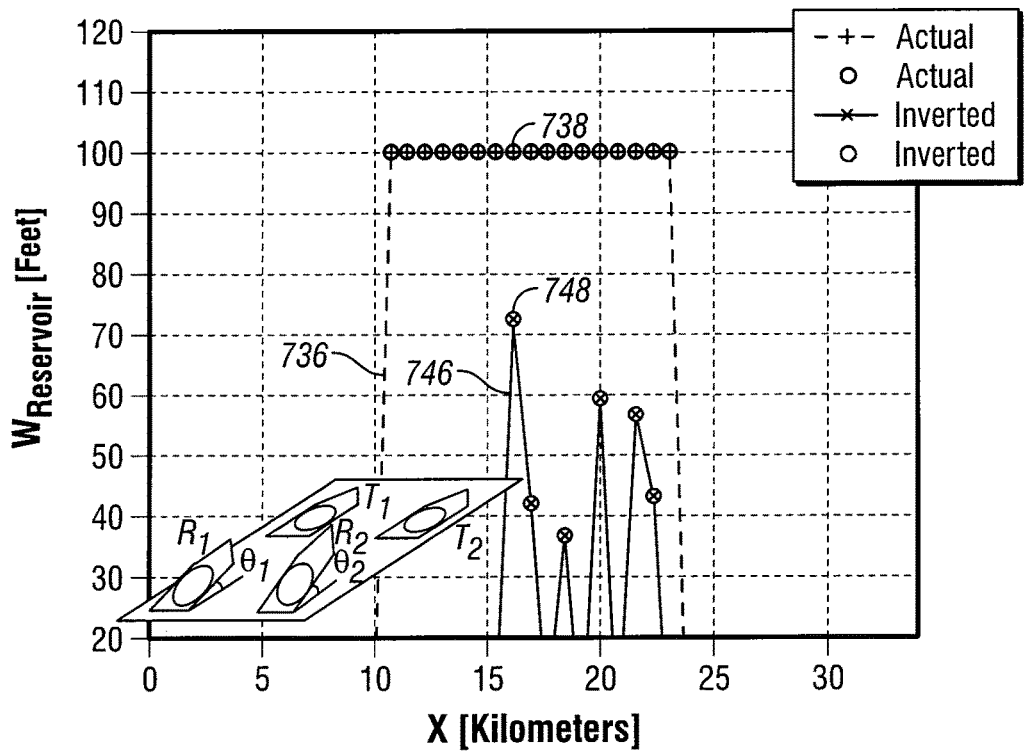
Figure 7D:
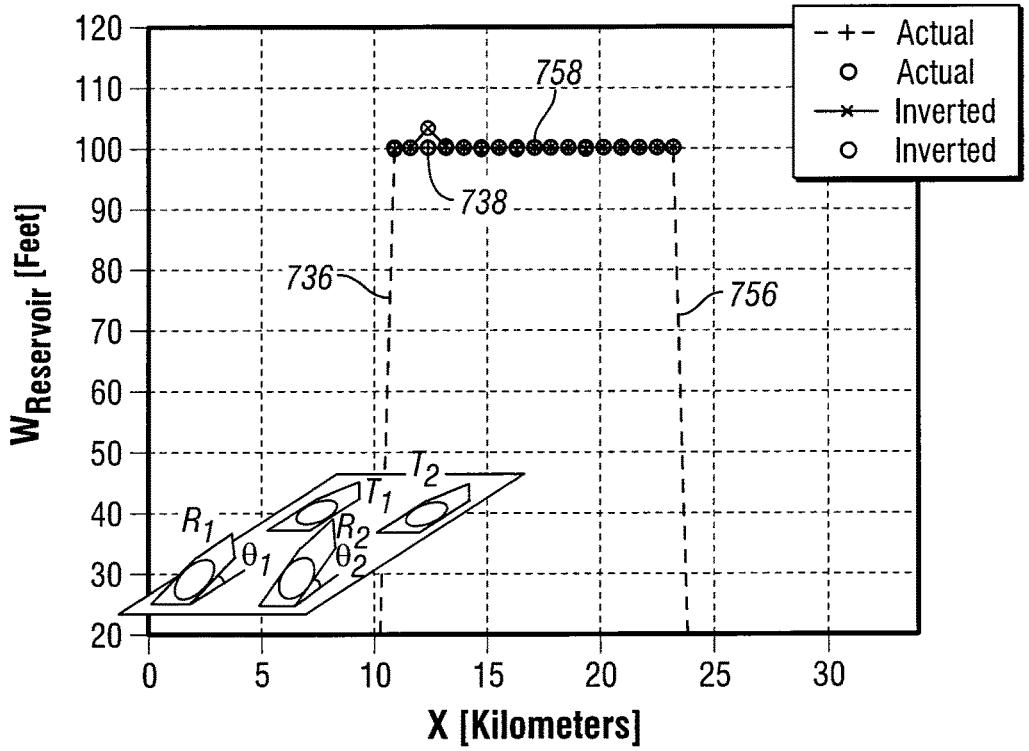

FIGS. 7A and 7C utilize the conventional (non-compensated) measurement signals applied to the inversion algorithm. FIGS. 7B and 7D utilize the compensated measurement as described in equation (2). Curves 732 and 736 and points 734 and 738 show the actual reservoir parameters, while curves 742 and 746 and points 744 and 748 show the results of inversion algorithm for non-compensated measurements and curves 752 and 756 and points 754 and 758 show the results of inversion algorithm for compensated measurements. FIGS. 7A and 7C show that the conventional measurement results are highly affected by the deviations in elevation angle of the receivers such that inversion is instable and inaccurate. Inversion results associated with the compensated measurements, shown in FIGS. 7B and 7D in which actual and inversion results are shown as essentially the same, provide good agreement with the actual parameters. As a result, it may be concluded that the compensated measurements can significantly increase the stability and accuracy of the inversion results in case of deviations in sensor elevation angles.

Figure 8A:
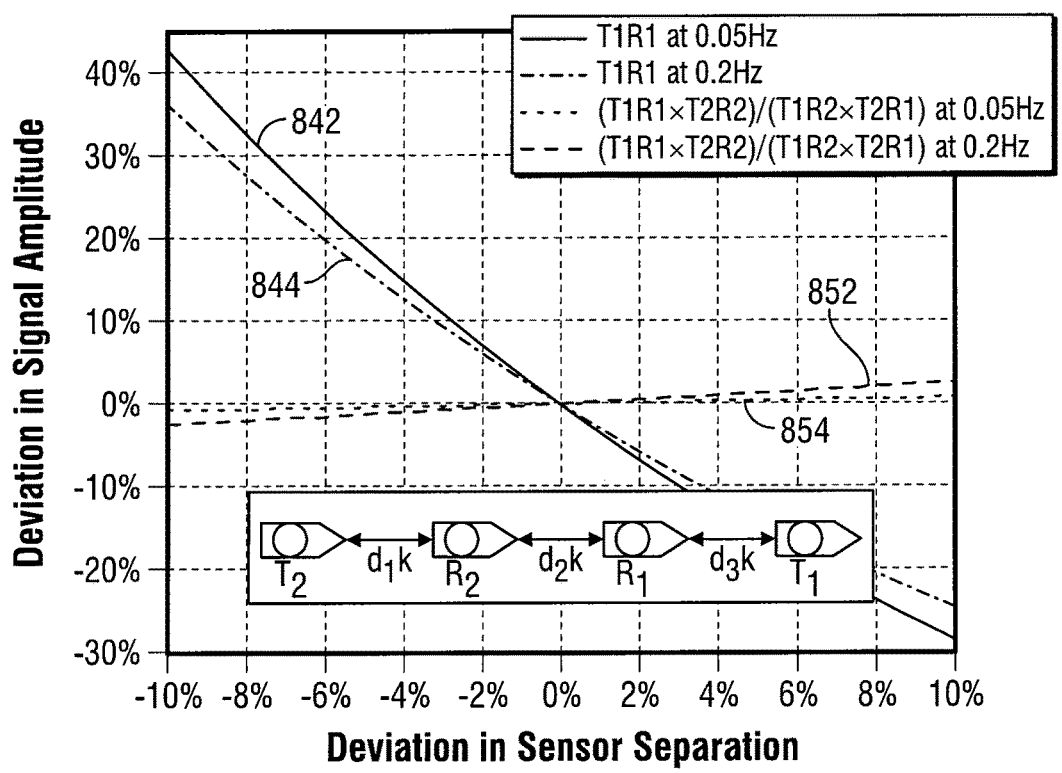
FIGS. 8A-8B show results of a model comparing a conventional approach to determine effect of deviations in sensor position with an example of a compensated signal technique in accordance with various embodiments.
Figure 8B:
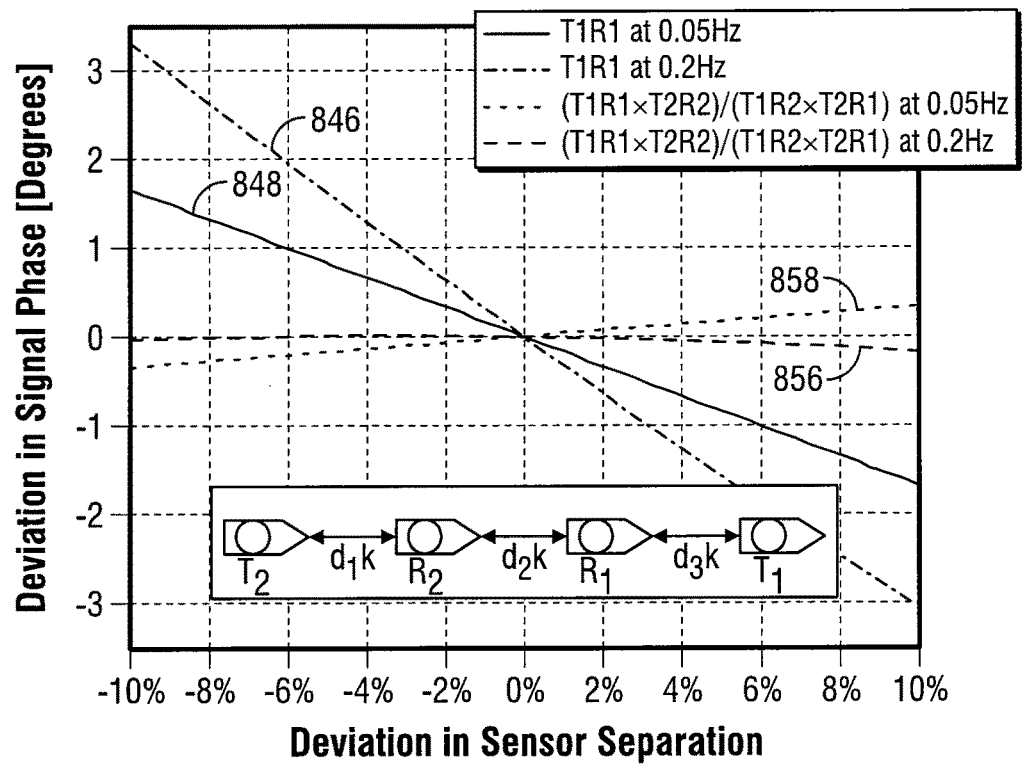

FIGS. 8A-8B shows results of a model comparing a conventional approach to determine effect of deviations in sensor separation with an example embodiment of a compensated signal technique. Deviations in sensor separation can occur, for example, due to tension or thermal expansions in the towing lines. In this example, a linear sensor arrangement with co-linear sensor orientation is considered. With no deviation, the distance between T2 and R2 is 5500 feet; the distance between R2 and R1 is 1000 feet; and the distance between R1 and T1 is 5500 feet. These sensors are placed in a linear formation, which has a length L=3.6576 km. The controlled source measurement is operated at two frequencies f=0.05 Hz and f=0.2 Hz in this example. Parameters for this example include soil resistivity $R_{soil}$=1Ω. Deviation, in this example, is defined as a multiplicative constant k with respect to each of these set distances.

In FIG. 8A, curves 842 and 844 show deviation in signal amplitude for non-compensation analysis with use of T1 and R1 at frequency 0.2 Hz and at 0.05 Hz, respectively. Curves 852 and 854 show deviation in signal amplitude for compensation analysis using T1, R1, R2, and T2 at frequency 0.2 Hz and at 0.05 Hz, respectively. In FIG. 8B, curves 846 and 848 show deviation in signal phase for non-compensation analysis with use of T1 and R1 at frequency 0.2 Hz and at 0.05 Hz, respectively, and curves 856 and 858 show deviation in signal phase for compensation analysis using T1, R1, R2, and T2 at frequency 0.2 Hz and at 0.05 Hz, respectively. It can be seen from these results that both amplitude and phase of the compensated signal is less sensitive to deviations in sensor separation, when compared to the non-compensated signal. For the compensation operation, a 10% change in sensor separation produces only 2% change in the amplitude and 0.3 degree change in the phase in the worst case for the parameters used in this example.

Figure 9A:
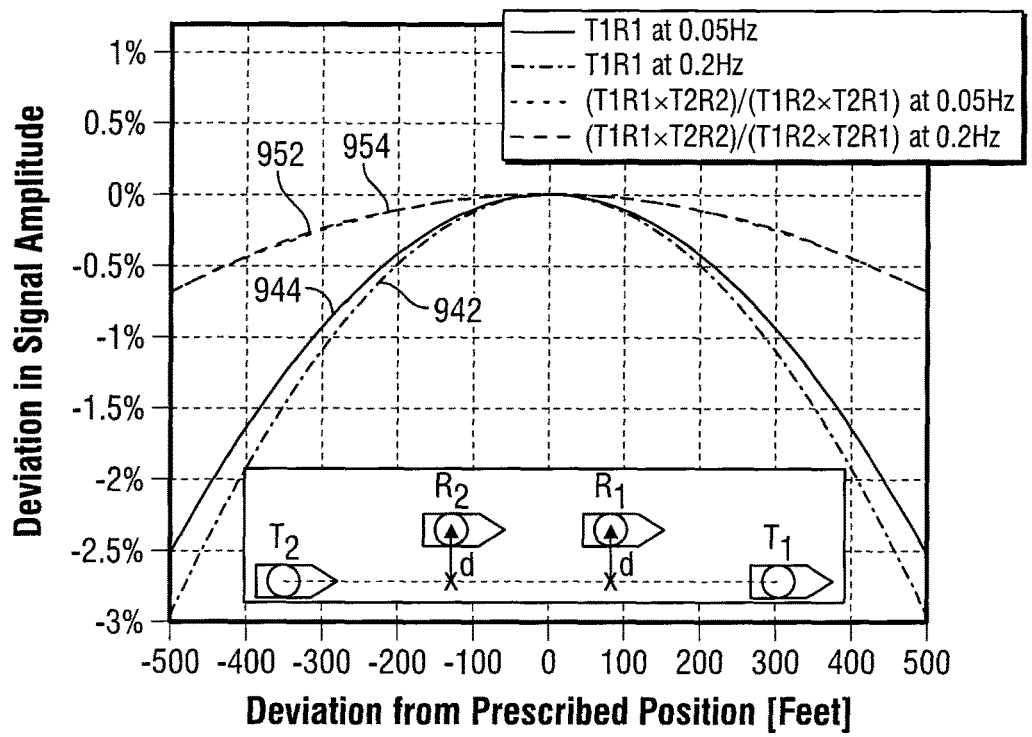
FIGS. 9A-9B show results of a model comparing a conventional approach to determine effect of misalignment in sensor position with an example of a compensated signal technique in accordance with various embodiments.
Figure 9B:
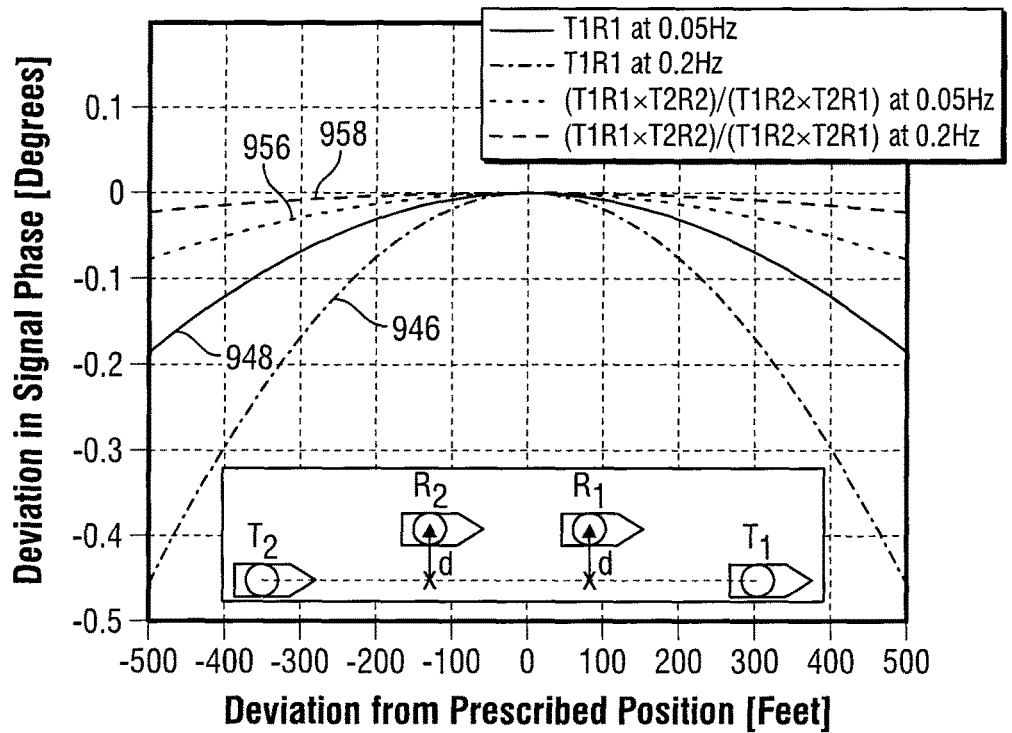

FIGS. 9A-9B shows results of a model comparing a conventional approach to determine effect of misalignment in sensor position with an example embodiment of a compensated signal technique. Misalignment in sensor separation can occur, for example, due to long distances between the sensors and different drifts acting on them. In this example, a linear sensor arrangement with co-linear sensor orientation is used again, similar to that in FIGS. 8A-B. With no deviation, the distance between T2 and R2 is 5500 feet; the distance between R2 and R1 is 1000 feet; and the distance between R1 and T1 is 5500 feet. These sensors are placed in a linear formation, which has a length L=3.6576 km. The controlled source measurement is operated at two frequencies f=0.05 Hz and f=0.2 Hz in this example. Parameters for this example include soil resistivity $R_{soil}$=1Ω. Deviation, in this example, is defined as a distance d from a line through the centers of the transmitters and receivers in the linear arrangement.

In FIG. 9A, curves 942 and 944 show deviation in signal amplitude with respect to amount of drift for non-compensation analysis with use of T1 and R1 at frequency 0.2 Hz and at 0.05 Hz, respectively. Curves 952 and 954 show deviation in signal amplitude with respect to amount of drift for compensation analysis using T1, R1, R2, and T2 at frequency 0.2 Hz and at 0.05 Hz, respectively. In FIG. 9B, curves 946 and 948 show deviation in signal phase with respect to amount of drift for non-compensation analysis with use of T1 and R1 at frequency 0.2 Hz and at 0.05 Hz, respectively. Curves 956 and 958 show deviation with respect to amount of drift in signal phase for compensation analysis using T1, R1, R2, and T2 at frequency 0.2 Hz and at 0.05 Hz, respectively. It can be seen from the results that both amplitude and phase of the compensated signal is less sensitive to deviations in sensor separation, when compared to the non-compensated signal. For the compensation operation, a 10% change in sensor separation produces only 0.7% change in the amplitude and 0.07 degree change in the phase in the worst case for the parameters used in this example.

Figure 10:
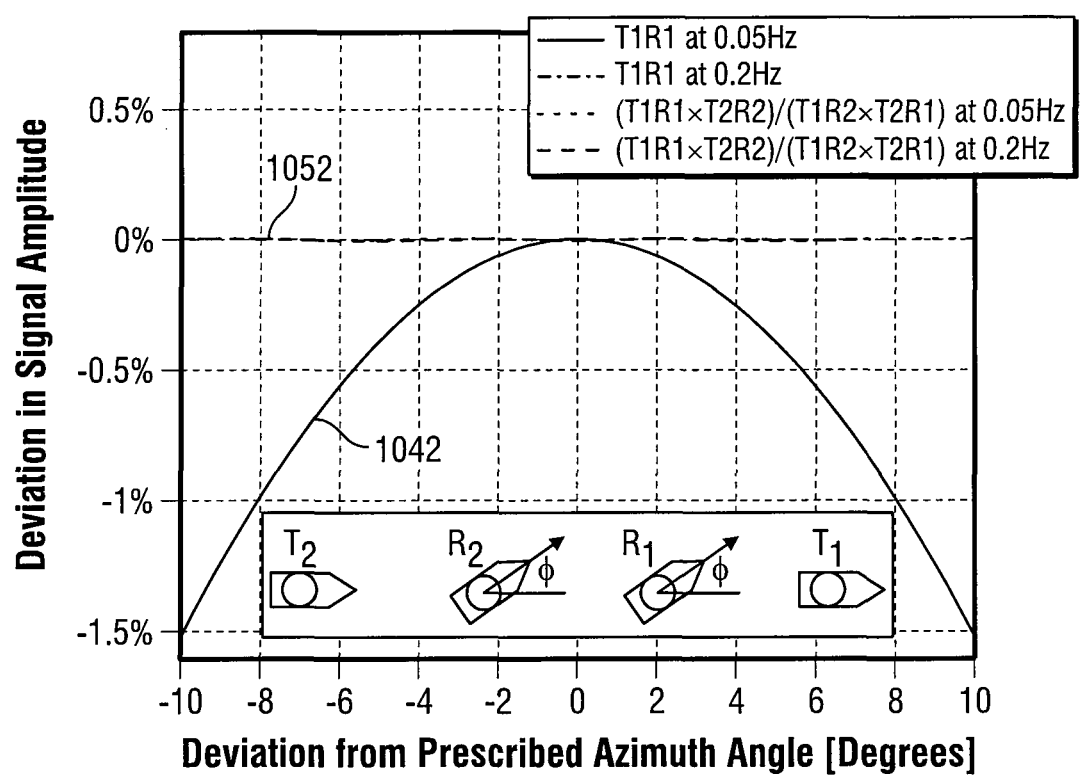
FIG. 10 shows results of a model comparing a conventional approach to determine effect of misalignment in sensor orientation with an example of a compensated signal technique in accordance with various embodiments.

FIG. 10 shows results of a model comparing a conventional approach to determine effect of misalignment in sensor orientation with an example embodiment of a compensated signal technique. The sensor orientation can be evaluated with respect to the horizontal plane. In this example, a linear sensor arrangement with co-linear sensor orientation is used again, similar to that in FIGS. 8A-B. With no deviation, the distance between T2 and R2 is 5500 feet; the distance between R2 and R1 is 1000 feet; and the distance between R1 and T1 is 5500 feet. These sensors are placed in a linear formation, which has a length L=3.6576 km. The controlled source measurement is operated at two frequencies f=0.05 Hz and f=0.2 Hz in this example. Parameters for this example include soil resistivity $R_{soil}$=1Ω.

Deviation, in this example, is examined with respect to prescribed azimuth angle in the horizontal plane.

Curve 1042 shows deviation in signal amplitude with respect to sensor orientation for non-compensation analysis and curve 1052 shows deviation in signal amplitude with respect to sensor orientation for compensation analysis. Each of curves 1042 and 1052 show results are that the same for 0.05 Hz and 0.2 Hz. It can be seen from the results that amplitude of the compensated signal is almost insensitive to deviations in sensor angle in the x-y plane, when compared to the non-compensated signal. FIGS. 7A-D through FIG. 10 indicate that analysis based on compensated signals provide reliable measurements that are largely independent of weather conditions.

Figure 11A:
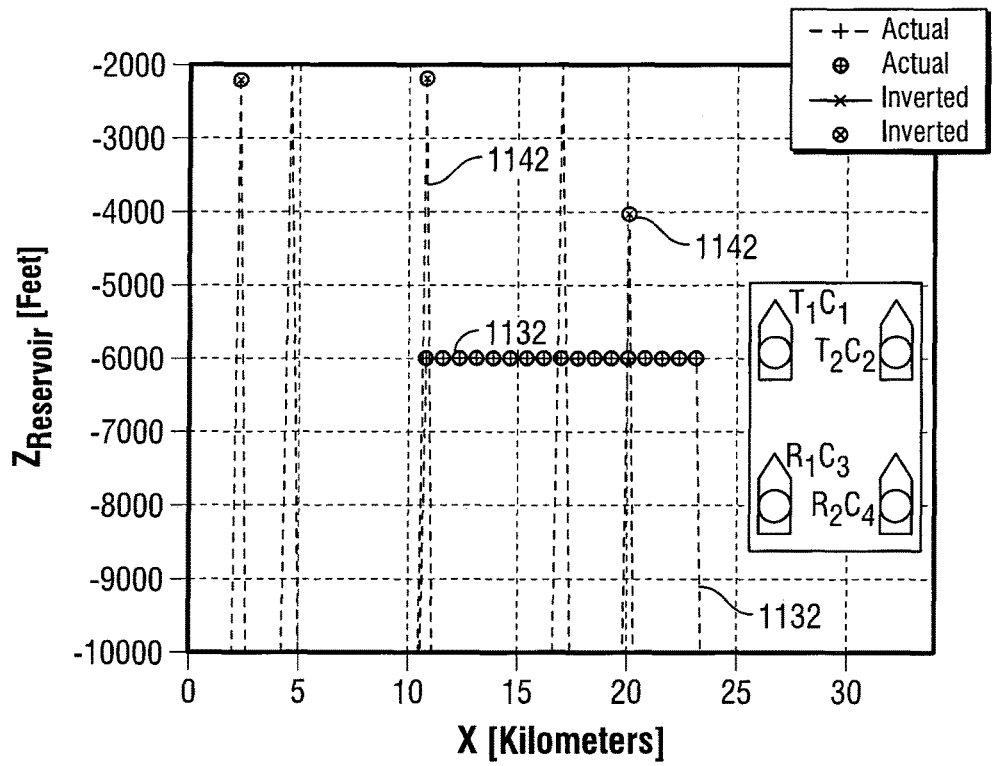
FIGS. 11A-D show results of a model comparing a conventional approach with sensors having random strength and phase with an example of a compensated signal technique in accordance with various embodiments.
Figure 11B:
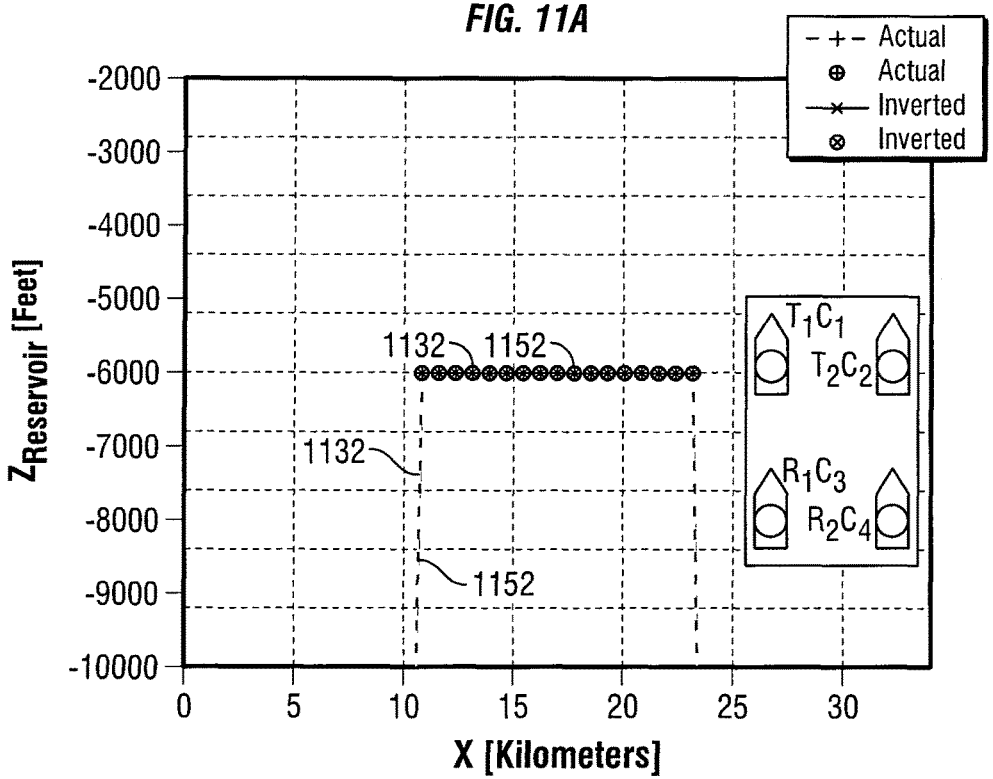
Figure 11C:
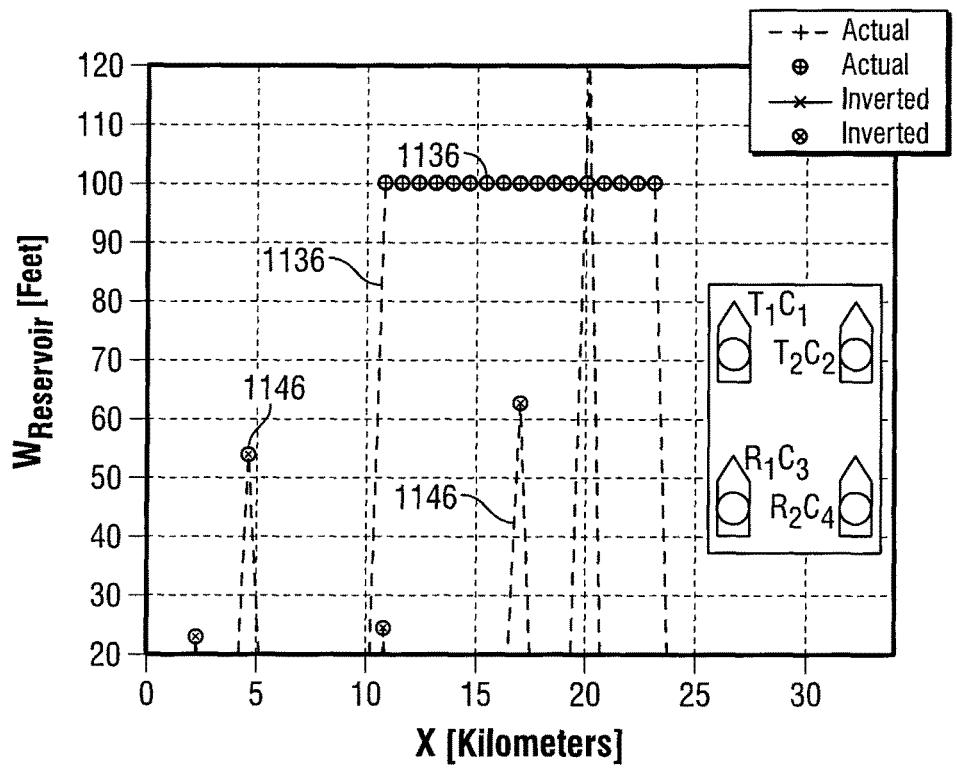
Figure 11D:
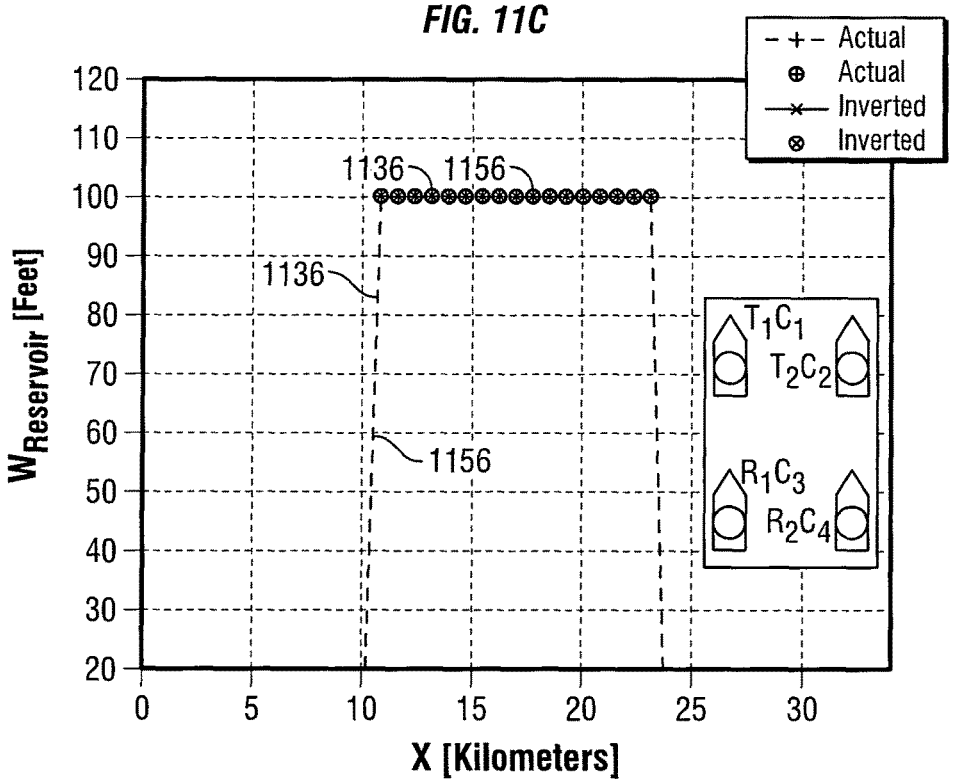

FIGS. 11A-D shows results of a model comparing a conventional approach with sensors having random strength and phase with an example embodiment of a compensated signal technique. In this example, at each measurement step, all sensors have random strength and phase. The results are for a controlled source measurement using two electric dipole transmitting sensors, T1 and T2, and two electric dipole receiving sensors, R1 and R2, similar to that in FIGS. 7A-D. These sensors are placed in a rectangular formation, where each side of the rectangle has a length L=3.6576 km. The controlled source measurement is operated at two frequencies f=0.05 Hz and f=0.2 Hz in this example. Parameters for this example include water resistivity $R_{water}=0.25\Omega$, soil resistivity $R_{soil}=1\Omega$, width of sea column $W_{sea}=250$ feet, reservoir depth $z_{reservoir}=6000$ feet, reservoir width $w_{reservoir}=100$ feet, reservoir resistivity=$50\Omega$ and reservoir size $L_{reservoir}=12$ km. A normal distribution in elevation angle with 30° standard deviation is considered. FIGS. 11A and 11C utilize the conventional (non-compensated) measurement signals applied to the inversion algorithm. FIGS. 11B and 11D utilize the compensated measurement as described in equation (2).

Curves and points 1132 and 1136 show the actual reservoir parameters, while curves and points 1142 and 1146 show the results of inversion algorithm for non-compensated measurements and curves and points 1152 and 1156 show the results of inversion algorithm for compensated measurements. Note that at these levels of measurement sensitivities, the actual reservoir parameters are essentially indistinguishable from inversion results using compensated measurement signals, where it can be seen from FIGS. 11B and 11D that the compensated measurement is independent of sensor strength and timing, verifying equation (4). The compensated signal technique provides reliable measurements largely independent of sensor strength and timing such that substantially accurate results can be obtained without GPS synchronization or sensor calibration for amplitude or phase.

FIGS. 7A-7D through 11A-11D demonstrate that the compensated results, which can be provided by various embodiments, can be made largely independent of sensor orientation, sensor position, sensor strength, sensor phase, which may eliminate a need for expensive device components to compensate for weather, sensor or synchronization effects. This compensation technique can be especially useful in suppressing effects of varying environmental conditions on the sea surface or underwater, which would otherwise need to be suppressed mechanically or electronically. For example, in order to suppress effects of waves on a small vessel on the sea surface, a vessel may need to be large and heavy enough to provide stability in orientation and position. Furthermore, vessels in tow may need to be supported by multiple ships. Alternatively, in another process to take into consideration environmental perturbations when using a conventional measurement system, orientation and position of the sensors are tracked via a separate system, whose inclusion in the data acquisition is provided as an input parameter in the inversion operation. Such tracking would use GPS or alternative devices, which may not be operational under harsh weather conditions. Without any compensation provided in the various embodiments, sensor strengths need to be calibrated to known values and sensors need to be placed in similar conditions. For example, sensors installed on different materials on the seafloor may produce variations in the effective sensor strength. However, in various embodiments, a compensated signal operation allows elimination of time-consuming calibration, expensive electronics to keep track of sensor parameters, and reliability problems due to environmental conditions.

In various embodiments, compensated measurement, as described herein, can be extended to arrays of large number of sensors. Inversion operations can be applied to data from large sensor arrays to generate inversion outputs that provide information regarding the shape and depth profile of reservoirs that span very large distances. Use of sensor arrays can also improve accuracy and reliability of the inversion operation. Typically, measurements at multiple locations are performed by placing the sensors on vessels and moving the vessels on a certain path. With arrays of sensors, measurements at different points can be taken while the vessels are moving. The compensated measurement technique can also reduce effects of movement in sensor parameters for array using a straightforward extension to the examples described with respect to FIGS. 7A-D-11A-D. For example, the array can be operated in sets of receivers with selected transmitters as discussed with respect to FIG. 5.

Figure 12A:
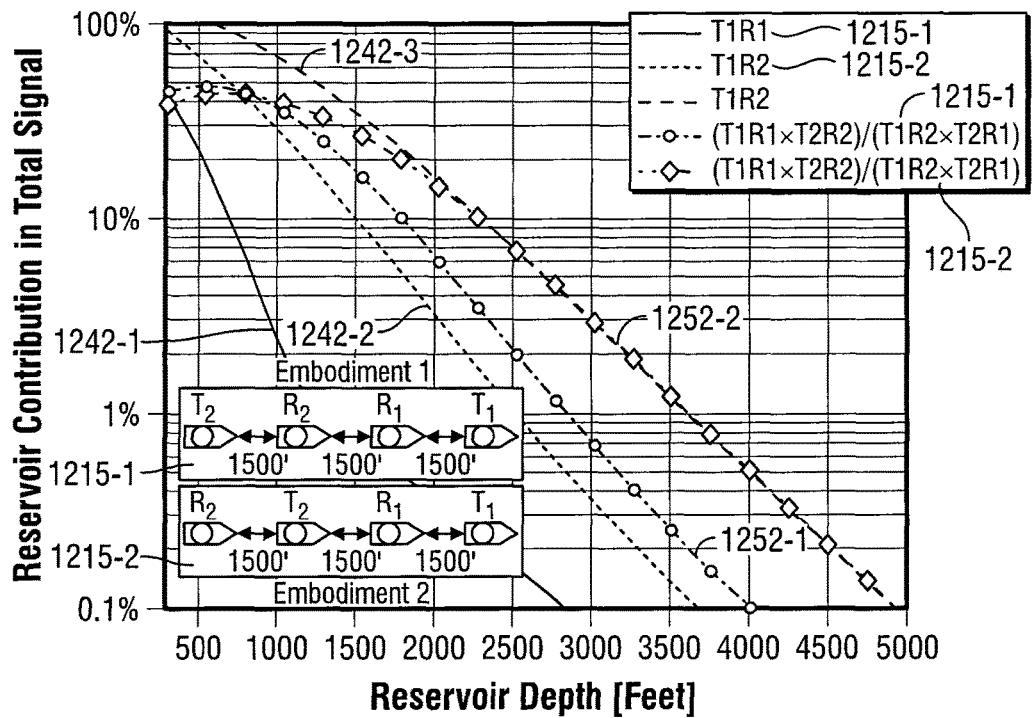
FIGS. 12A-D show results of a model comparing a conventional approach to determine reservoir contribution to the total signal with an example of a compensated signal technique in accordance with various embodiments.

FIGS. 12A-D shows results of a model comparing a conventional approach to determine reservoir contribution to the total signal with an example embodiment of a compensated signal technique. The reservoir contribution in the total signal is shown with respect to reservoir depth for various arrangements shown in each figure inset. FIG. 12A shows a two linear arrangements 1215-1 and 1215-2, where each arrangement has a length L=1.3716 km operating at a frequency of 1 Hz with respect to a soil resistivity $R_{soil}=1\Omega$. Curves 1242-1, 1242-2, and 1242-3 result from inversion of uncompensated signals, where curve 1242-1 corresponds to arrangement 1215-1 using T1 and R1, curve 1242-2 corresponds to arrangement 1215-1 using T1 and R2, and curve 1242-3 corresponds to arrangement 1215-2 using T1 and R2. Curves 1252-1 and 1252-2 result from inversion of compensated signals, where curve 1252-1 corresponds to arrangement 1215-1 and curve 1252-2 corresponds to arrangement 1215-2, both arrangements 1215-1 and 1215-2 using T1, R1, R2, and T2.

Figure 12B:
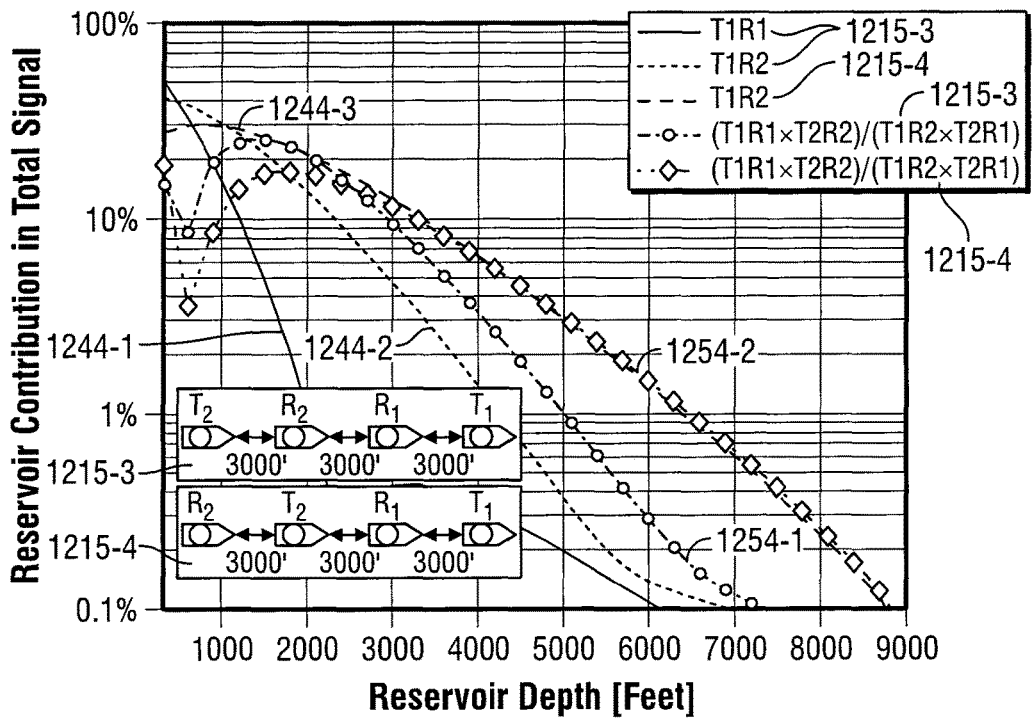

FIG. 12B shows a two linear arrangements 1215-3 and 1215-4, where each arrangement has a length L=2.7432 km operating at a frequency of 0.05 Hz with respect to a soil resistivity $R_{soil}=1\Omega$. Curves 1244-1, 1244-2, and 1244-3 result from inversion of uncompensated signals, where curve 1244-1 corresponds to arrangement 1215-3 using T1 and R1, curve 1244-2 corresponds to arrangement 1215-3 using T1 and R2, and curve 1244-3 corresponds to arrangement 1215-4 using T1 and R2. Curves 1254-1 and 1254-2 result from inversion of compensated signals, where curve 1254-1 corresponds to arrangement 1215-3 and curve 1254-2 corresponds to arrangement 1215-4, both arrangements 1215-3 and 1215-4 using T1, R1, R2, and T2.

Figure 12C:
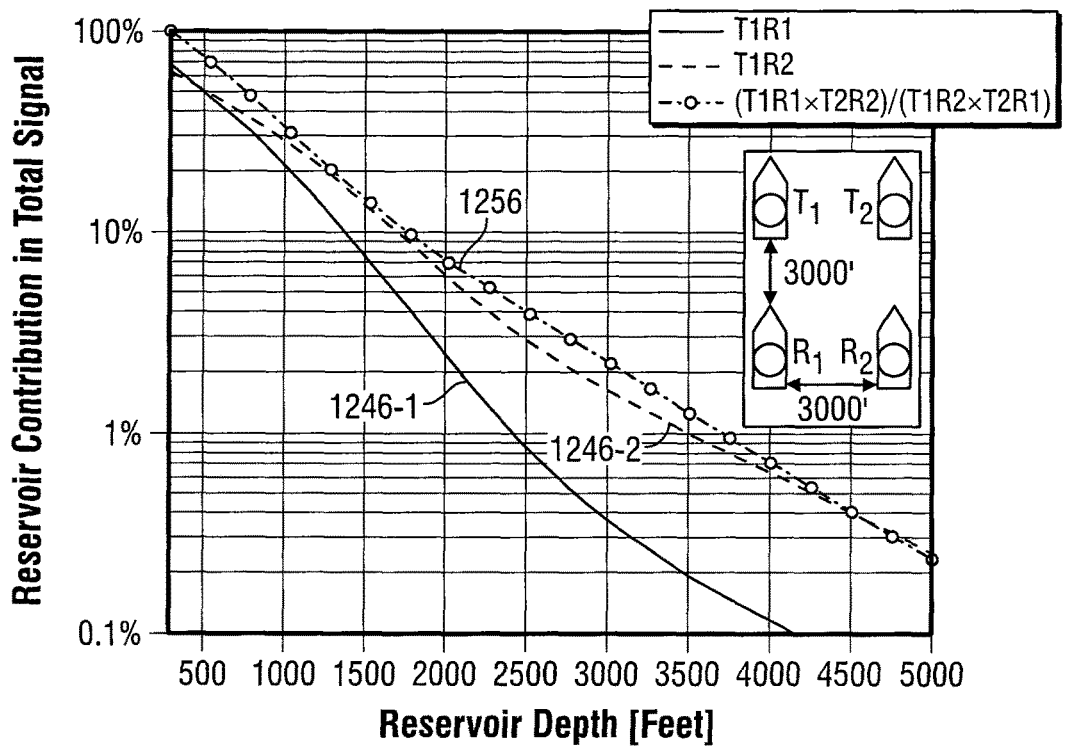

FIG. 12C shows a rectangular arrangement, where each side of the rectangle has a length L=0.9144 km operating at a frequency of 0.5 Hz with respect to a soil resistivity $R_{soil}$=1Ω. Curves 1246-1 and 1246-2 result from inversion of uncompensated signals, where curve 1246-1 corresponds to use of T1 and R1 and curve 1246-2 corresponds to use of T1 and R2. Curve 1256 results from inversion of compensated signals using T1, R1, R2, and T2.

Figure 12D:
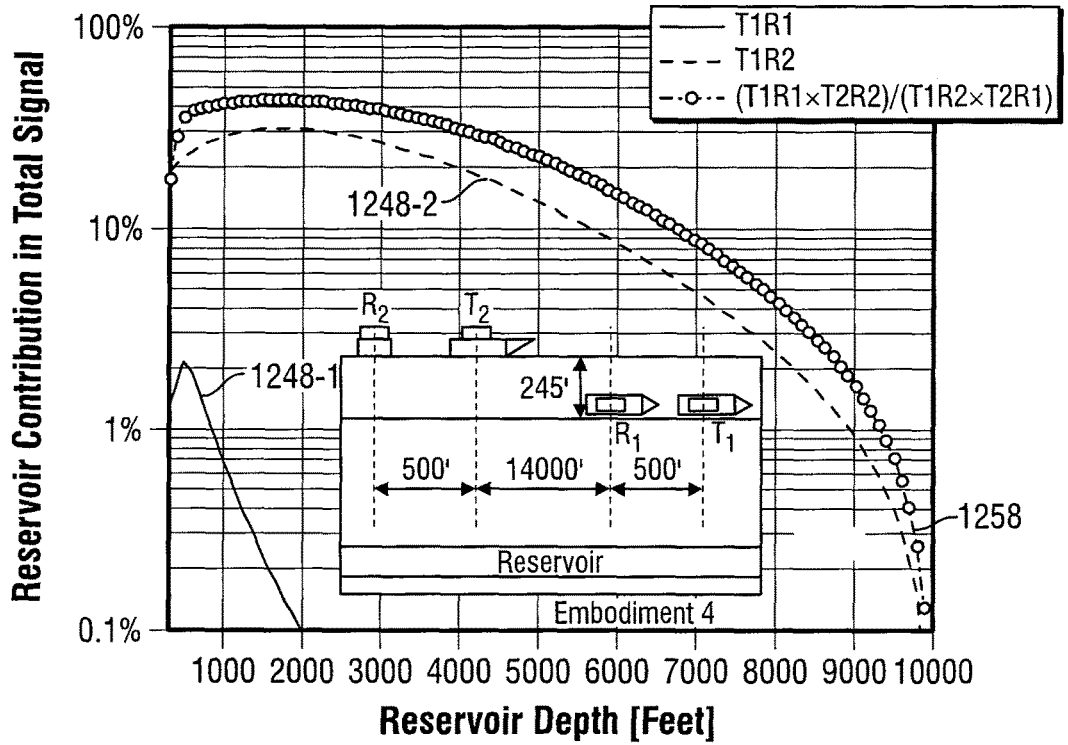

FIG. 12D shows an arrangement in which multiple sensor vehicles are combined. The combination includes a ship, a tow, and two submarines, where the combination has an effective linear length L=4.573 km operating at a frequency of 0.1 Hz with respect to a soil resistivity $R_{soil}$=1Ω. Curves 1248-1 and 1248-2 result from inversion of uncompensated signals, where curve 1248-1 corresponds to use of T1 and R1 and curve 1248-2 corresponds to use of T1 and R2. Curve 1256 results from inversion of compensated signals using T1, R1, R2, and T2.

From FIGS. 12A-D, it can be seen that the compensated measurement leads to approximately equal or stronger reservoir signal. The maximum depth of detection is the largest depth at which sensing of the reservoir is possible. For a system with 1% noise level, this maximum depth corresponds to 3600, 6500, 3750 and 9400 feet range of detection for FIGS. 10A, 10B, 10C, and 10D, respectively. Larger depth of detection can be obtained by increasing the separation between the sensors and reducing the frequency. In various embodiments, systems and compensation processes, as described herein, can provide deep and accurate sensing of underground reservoirs.

As shown in FIGS. 7A-D, 11A-D, and 12D, compensation techniques, in accordance with the teachings herein, can be performed in situations where sensors are not restricted to be collinear or coplanar arrangement. In fact, any combination of sensor types and localizations, as indicated in FIGS. 1 and 4, can be effectively used in various embodiments to provide compensated measurement. In a typical scenario, the location and type of sensors can be chosen to maximize sensitivity and spatial diversity for optimum inversion accuracy and stability.

Various components of a measurement system including a plurality of sensors and a processing unit, which provides for compensation of measurement signals on which inversions operations can be applied to determine parameters of an underground region, as described herein or in a similar manner, can be realized in combinations of hardware and software implementations. These implementations may include a machine-readable medium having machine-executable instructions, such as a computer-readable medium having computer-executable instructions, for operating the system to generate a ratio from signals measured relative to an underground environment and to perform an inversion operation on the generated ratio to determine parameters of the underground environment. The instructions can include activating a plurality of transmitters and collecting signals received at a plurality of receivers in response to activating the plurality of transmitters, where collected signals are used to generate the ratio. The instructions can include operating the transmitters and receivers with the transmitters and receivers disposed with respect to each other as a substantially rectangular arrangement. The rectangular arrangement of transmitters and receivers can be a substantially square arrangement.

The instructions can comprise generating the ratio for receivers j and k of the plurality of receivers and for transmitters i and k of the plurality of transmitters such that the generated ratio includes $$\frac{V_{ij}V_{kl}}{V_{il}V_{kj}},$$

where $V_{ij}$ is the signal obtained at receiver j when transmitter i is transmitting, $V_{kj}$ is the signal obtained at receiver j when transmitter k is transmitting, $V_{il}$ is the signal obtained at receiver l when transmitter i is transmitting, $V_{kl}$ is the signal obtained at receiver l when transmitter k is transmitting. The instructions can include controlling operation of transmitters and receivers, where the transmitters and receivers are all disposed at or above the surface of a body of water, the transmitters and receivers are all disposed in the body of water, the transmitters and receivers are all disposed on or below a land surface and/or a floor of the body of water, or the transmitters and receivers are distributed among the body of water and land near the body of water. In addition, the instructions can include selecting transmitters and selecting a plurality of sets of receivers to pair with the selected transmitters such that activation of the selected transmitters and collection of measured signals from receivers in each respective set provides measured signals for array processing of ratios for performing inversion operations.

The instructions can be executed by a controller, or processor, to manage the compensation measurement technique. The instructions can be realized as a processing unit or a portion of a processing unit that at least includes the functionality and capability of processing units described herein, for example, such as with respect to, but not limited to, FIGS. 1, 2, 5, 6. The instructions can include performing an inversion operation or inversion operations using a forward model or a library. The forward model and/or library can be stored in the same machine-readable medium, a different machine-readable medium, or distributed over machine-readable media at different locations. The instructions can include performing an inversion operation or inversion operations by performing an iterative process or performing a pattern matching process. The instructions can include applying inversion operations such that a reservoir depth, a reservoir thickness, a reservoir resistivity, a reservoir shape, or a combination thereof can be determined. The instructions can be used to direct a drilling operation in response to applying results from inversion on compensated signals.

Figure 13:
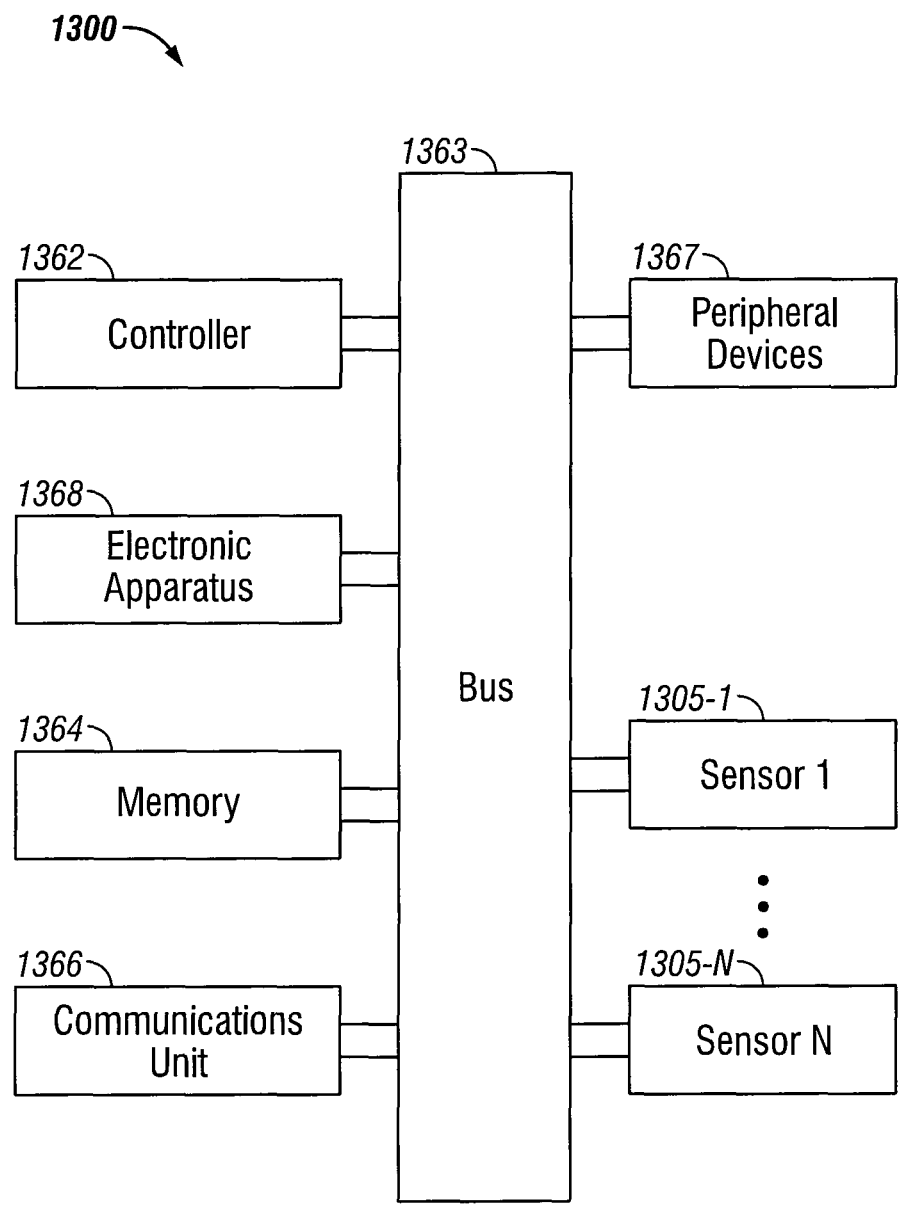
FIG. 13 depicts a block diagram of features of an example system to process received signals at sensors to compensate for effects of environment and other perturbations on the measuring tools, according to various embodiments.

FIG. 13 depicts a block diagram of features of an example embodiment of a system 1300 to process received signals at sensors to compensate for effects of environmental and other perturbations on the measuring tools of system 1300. System 1300 includes sensors 1305-1 . . . 1305-N having arrangements of transmitters and receivers that can be realized in a similar or identical manner to arrangements discussed herein.

System 1300 also includes a controller 1362, a memory 1364, an electronic apparatus 1368, and a communications unit 1366. Controller 1362, memory 1364, and communications unit 1366 can be arranged to operate as a processing unit to compensate measurement signals provided by sensors 1305-1 . . . 1305-N and to perform one or more inversion operations on the compensated measurement signals to determine properties of an underground environment, which may include analysis of an underground reservoir. Processing unit may be distributed among the components of system 1300 including electronic apparatus 1368, which may include circuitry that can generate a ratio or ratios of measured signals to compensate for perturbing measurement effects. Controller 1362, memory 1364, and electronic apparatus 1368 can be realized to include control activation of transmitter antennas and selection of receiver antennas in the group of sensors 1305-1 . . . 1305-N and to manage processing schemes in accordance with measurement procedures and signal processing as described herein. Communications unit 1366 can include downhole communications for appropriately located sensors. Such downhole communications can include a telemetry system. Communications unit 1366 can include communications operable among land locations, sea surface locations both fixed and mobile, and undersea locations both fixed and mobile. Communications unit 1366 may use combinations of wired communication technologies and wireless technologies at frequencies that do not interfere with on-going measurements.

System 1300 can also include a bus 1363, where bus 1363 provides electrical conductivity among the components of system 1300. Bus 1363 can include an address bus, a data bus, and a control bus, each independently configured. Bus 1363 can be realized using a number of different communication mediums that allows for the distribution of components of system 1300 as shown with respect to FIGS. 1-12. Use of bus 1363 can be regulated by controller 1362.

In various embodiments, peripheral devices 1367 can include displays, additional storage memory, and/or other control devices that may operate in conjunction with controller 1362 and/or memory 1364. In an embodiment, controller 1362 is realized as a processor or a group of processors that may operate independently depending on an assigned function. Peripheral devices 1367 can be arranged with a display can be used with instructions stored in memory 1364 to implement a user interface to manage the operation of sensors 1305-1 . . . 1305-N and/or components distributed within system 1300. Such a user interface can be operated in conjunction with communications unit 1366 and bus 1363. In various embodiments, systems and processes of compensated measurements provide reliable controlled source measurements that are largely independent of weather conditions, sensor strength, and sensor timing. Use of expensive electrical or mechanical components to compensate for weather, sensor, or synchronization effects may be reduced significantly in such compensation based systems. The compensation techniques can be applied to large arrays of mixed types of sensors or vessels. Such systems and processes allow deep and accurate sensing of underground reservoirs, which may be used to direct drilling operations.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
    distributing a plurality of transmitters among different locations;
    distributing a plurality of receivers at different structures among different locations;
    collecting signals received at the plurality of receivers in response to activating the plurality of transmitters, the collected signals used to generate a ratio;
    generating the ratio from signals of the collected signals measured at the different structures, the structures subject to perturbative environmental effects and the ratio selected to compensate for the perturbative environmental effects, the signals related to an underground region; and
    performing an inversion operation on the generated ratio to determine parameters of the underground region, wherein for receivers j and k of the plurality of receivers and for transmitters i and k of the plurality of transmitters, the generated ratio includes $$\frac{V_{ij}V_{kl}}{V_{il}V_{kj}},$$

where $V_{ij}$ is the signal obtained at receiver j when transmitter i is transmitting, $V_{kj}$ is the signal obtained at receiver j when transmitter k is transmitting, $V_{il}$ is the signal obtained at receiver l when transmitter i is transmitting, $V_{kl}$ is the signal obtained at receiver l when transmitter k is transmitting.

2. The method of claim 1, wherein the transmitters and receivers are disposed at or above the surface of a body of water, the transmitters and receivers are disposed in the body of water, the transmitters and receivers are disposed on or below a land surface and a floor of the body of water, or the transmitters and receivers are distributed among the body of water and land near the body of water.

3. The method of claim 1, wherein the method includes selecting transmitters and selecting a plurality of sets of receivers to pair with the selected transmitters such that activation of the selected transmitters and collection of measured signals from receivers in each respective set provides measured signals for array processing of ratios for performing inversion operations.

4. The method of claim 1, wherein performing the inversion operation includes using a forward model or a library.

5. The method of claim 1, wherein performing the inversion operation includes performing an iterative process or performing a pattern matching process.

6. The method of claim 1, wherein the method includes applying the inversion operation such that a reservoir depth, a reservoir thickness, a reservoir resistivity, a reservoir shape, or a combination thereof is determined.

7. A system comprising:
    a plurality of transmitters, the transmitters distributed among different locations;
    a plurality of receivers, the receivers at different structures distributed among different locations; and
    a processing unit to control activation of the transmitters and to process signals received from the receivers to operatively generate a ratio from the received signals measured at the different locations, the structures subject to perturbative environmental effects and the ratio selected to compensate for the perturbative environmental effects, the signals related to an underground region, and to operatively perform an inversion operation on the generated ratio to determine parameters of the underground region, wherein for receivers j and k of the plurality of receivers and for transmitters i and k of the plurality of transmitters, the generated ratio includes $$\frac{V_{ij}V_{kl}}{V_{il}V_{kj}},$$

where $V_{ij}$ is the signal obtained at receiver j when transmitter i is transmitting, $V_{kj}$ is the signal obtained at receiver j when transmitter k is transmitting, $V_{il}$ is the signal obtained at receiver l when transmitter i is transmitting, $V_{kl}$ is the signal obtained at receiver l when transmitter k is transmitting.

8. The system of claim 7, wherein the transmitters and receivers are disposed at or above the surface of a body of water, the transmitters and receivers are disposed in the body of water, the transmitters and receivers are disposed on or below a land surface and a floor of the body of water, or the transmitters and receivers are distributed among the body of water and land near the body of water.

9. The system of claim 7, wherein the processing unit is operable to select transmitters and select a plurality of sets of receivers to pair with the selected transmitters such that activation of the selected transmitters and collection of measured signals from receivers in each respective set provides measured signals for array processing of ratios as input to inversion operations.

10. The system of claim 7, wherein the processing unit is operable to perform the inversion operation using a forward model or a library.

11. The system of claim 7, wherein the processing unit is operable to perform the inversion operation by an iterative process, by a pattern matching process, or a combination thereof.

12. The system of claim 7, wherein the processing unit is operable to apply the inversion operation such that a reservoir depth, a reservoir thickness, a reservoir resistivity, a reservoir shape, or a combination thereof is determined.

13. A machine-readable storage device having instructions stored thereon, which, when performed by a machine, cause the machine to perform operations, the operations comprising operations to:
  activate a plurality of transmitters;
  collect signals received at a plurality of receivers in response to activating the plurality of transmitters, the collected signals used to generate a ratio;
  generate the ratio from signals of the collected signals measured at different structures distributed among different locations, the structures subject to perturbative environmental effects and the ratio selected to compensate for the perturbative environmental effects, the signals related to an underground region; and
  perform an inversion operation on the generated ratio to determine parameters of the underground region, wherein for receivers j and k of the plurality of receivers and for transmitters i and k of the plurality of transmitters, the generated ratio includes $$\frac{V_{ij} V_{kl}}{V_{il} V_{kj}},$$

where $V_{ij}$ is the signal obtained at receiver j when transmitter i is transmitting, $V_{kj}$ is the signal obtained at receiver j when transmitter k is transmitting, $V_{il}$ is the signal obtained at receiver l when transmitter i is transmitting, $V_{kl}$ is the signal obtained at receiver l when transmitter k is transmitting.

14. The machine-readable storage device of claim 13, wherein the transmitters and receivers with the transmitters and receivers are disposed with respect to each other as a substantially rectangular arrangement.

15. The machine-readable storage device of claim 14, wherein the transmitters and receivers are disposed with respect to each other as a substantially square arrangement.

16. The machine-readable storage device of claim 13, wherein the transmitters and receivers are disposed at or above the surface of a body of water, the transmitters and receivers are disposed in the body of water, the transmitters and receivers are disposed on or below a land surface and a floor of the body of water, or the transmitters and receivers are distributed among the body of water and land near the body of water.

17. The machine-readable storage device of claim 13, wherein the instructions include selecting transmitters and selecting a plurality of sets of receivers to pair with the selected transmitters such that activation of the selected transmitters and collection of measured signals from receivers in each respective set provides measured signals for array processing of ratios for performing inversion operations.

18. The machine-readable storage device of claim 13, wherein the operations include performing the inversion operation or inversion operations using a forward model or a library.

19. The machine-readable storage device of claim 13, wherein the operations that include performing the inversion operation or inversion operations include performing an iterative process or performing a pattern matching process.

20. The machine-readable storage device of claim 13, wherein the operations include applying the inversion operation such that a reservoir depth, a reservoir thickness, a reservoir resistivity, a reservoir shape, or a combination thereof is determined.

* * * * *